United States Patent
Chin et al.

(10) Patent No.: US 12,150,038 B2
(45) Date of Patent: Nov. 19, 2024

(54) GATEWAY-BASED VOICE CALLS VIA A BASE STATION

(71) Applicant: QUALCOMM Incorporated, San Diego, CA (US)

(72) Inventors: Tom Chin, San Diego, CA (US); Ajith Tom Payyappilly, San Diego, CA (US); Juan Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 613 days.

(21) Appl. No.: 17/339,732

(22) Filed: Jun. 4, 2021

(65) Prior Publication Data

US 2021/0385735 A1    Dec. 9, 2021

Related U.S. Application Data

(60) Provisional application No. 63/036,381, filed on Jun. 8, 2020.

(51) Int. Cl.
| | | |
|---|---|---|
| *H04W 48/16* | (2009.01) | |
| *H04W 76/10* | (2018.01) | |
| *H04W 88/16* | (2009.01) | |

(52) U.S. Cl.
CPC .......... *H04W 48/16* (2013.01); *H04W 76/10* (2018.02); *H04W 88/16* (2013.01)

(58) Field of Classification Search
CPC ...... H04W 48/16; H04W 76/10; H04W 88/16
See application file for complete search history.

(56) References Cited

U.S. PATENT DOCUMENTS

| | | | |
|---|---|---|---|
| 11,689,971 B1* | 6/2023 | Saha | H04L 65/65 370/331 |
| 2008/0305799 A1* | 12/2008 | Zuniga | H04W 36/0072 455/437 |

(Continued)

FOREIGN PATENT DOCUMENTS

| | | | | |
|---|---|---|---|---|
| WO | WO-2019072099 A1 | | 4/2019 | |
| WO | WO-2020092173 A1 * | | 5/2020 | H04L 67/14 |

OTHER PUBLICATIONS

International Search Report and Written Opinion—PCT/US2021/036167—ISA/EPO—Sep. 28, 2021 (204846WO).

(Continued)

*Primary Examiner* — Brenda H Pham
(74) *Attorney, Agent, or Firm* — Holland & Hart LLP/Qualcomm Incorporated

(57) ABSTRACT

Methods, systems, and devices for wireless communications are described. A UE may establish a wireless communication link with a base station in accordance with a radio access technology (RAT), and an internet connection with the base station. The UE may identify a lack of support by a network that includes the base station for a type of voice calls associated with the RAT. The UE may transmit a discovery query for a gateway to a core network, and the UE may establish a connection with the gateway via the internet connection. The UE may initiate a voice call via a call path from the UE to the core network, where the call path may include the wireless communications link with the base station in accordance with the RAT and also may include the internet connection with the gateway.

30 Claims, 18 Drawing Sheets

(56) References Cited

U.S. PATENT DOCUMENTS

| | | | | |
|---|---|---|---|---|
| 2010/0136972 A1* | 6/2010 | Hsieh | ............... | H04W 36/0005 |
| | | | | 455/436 |
| 2011/0216743 A1* | 9/2011 | Bachmann | ............ | H04L 63/164 |
| | | | | 370/331 |
| 2013/0128865 A1* | 5/2013 | Wu | ................... | H04W 36/0022 |
| | | | | 370/331 |
| 2018/0132141 A1* | 5/2018 | Huang-Fu | ........... | H04L 65/1094 |
| 2019/0116551 A1 | 4/2019 | Faccin et al. | | |

OTHER PUBLICATIONS

Motorola Mobility, et al., "Selection between N3IWF and ePDG", 3GPP Draft, SA WG2 Meeting #124, S2-178927_N3IWF_EPDG Selection, 3rd Generation Partnership Project (3GPP), Mobile Competence Centre, 650, Route Des Lucioles, F-06921 Sophia-Antipolis Cedex, France, vol. SA WG2, No. Reno, Nevada, Nov. 27-Dec. 1, 2017, pp. 1-4, Nov. 27, 2017 (Nov. 27, 2017), XP051379928, Retrieved from the Internet: URL: http://www.3gpp.org/ftp/tsg%5Fsa/WG2%5FArch/TSGS2%5F124%5FReno/Docs/ retrieved on Nov. 27, 2017] the whole document.

\* cited by examiner

GATEWAY-BASED VOICE CALLS VIA A BASE STATION

CROSS REFERENCE

The present Application for Patent claims the benefit of U.S. Provisional Patent Application No. 63/036,381 by CHIN et al., entitled "GATEWAY-BASED VOICE CALLS VIA A BASE STATION" and filed Jun. 8, 2020, which is assigned to the assignee hereof and expressly incorporated by reference herein.

FIELD OF TECHNOLOGY

The following relates generally to wireless communications and more specifically to gateway-based voice calls via a base station.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). In some examples, a UE may attempt to initiate a voice call over one or more systems.

SUMMARY

The described techniques relate to improved methods, systems, devices, and apparatuses that support gateway-based voice calls via a base station. Generally, a user equipment (UE) may establish a wireless communications link with a base station in accordance with a given radio access technology (RAT), such as a fifth generation (5G) new radio (NR) RAT. The UE may identify a lack of support, by the base station or any other component within a wireless communications network that includes the base station, for a particular type of voice calls. The particular type of voice calls may be associated with same telecommunications standard or generation as the RAT (e.g., Voice over New Radio (VoNR) calls. In some cases, the lack of support for the particular type of voice calls may be based on a lack of support for a quality-of-service (QoS) bearer (e.g., a radio bearer having a correlated QoS) associated with the type of voice calls.

To make a voice call while still receiving the benefits (e.g., mobility, reliability, or throughput benefits) of the wireless communications link with the base station (e.g., the 5G wireless communications link), the UE may establish a connection with a gateway—e.g., an evolved packet data gateway (ePDG) in a fourth generation (4G) Long Term Evolution (LTE) system, or an interworking function in a 5G NR system (such as a non-3GPP interworking function (N3IWF), as one example)—where the gateway may support a connection to a core network, and where the core network may support packet-based calls (e.g., the core network may be or include an internet protocol (IP) multimedia subsystem (IMS) core network). For example, the UE may connect to the internet via the base station, and thus via the wireless communications link with the base station. The UE may transmit a discovery query for the gateway via the internet and subsequently establish an internet-based connection with the gateway. The UE may initiate a voice call via a call path from the UE to the core network that includes the wireless communications link with the base station along with the internet connection with the gateway, possibly among any other number of connections between any number of other nodes.

A method of wireless communications at a UE is described. The method may include establishing a wireless communications link with a base station of a wireless communications network, the wireless communications link in accordance with a first RAT, identifying a lack of support for voice calls in accordance with the first RAT, the lack of support associated with one or more components of the wireless communications network, establishing, via the wireless communications link with the base station, an internet connection, transmitting, via the wireless communications link and the internet connection, a discovery query for a gateway for a core network of the wireless communications network, establishing, based at least in part on the discovery query and the lack of support for voice calls in accordance with the first RAT, a connection with the gateway via the internet connection, and initiating a voice call via a call path that includes the wireless communications link with the base station and the connection with the gateway.

An apparatus for wireless communications at a UE is described. The apparatus may include a processor, memory coupled with the processor, and instructions stored in the memory. The instructions may be executable by the processor to cause the apparatus to establish a wireless communications link with a base station of a wireless communications network, the wireless communications link in accordance with a first RAT, identify a lack of support for voice calls in accordance with the first RAT, the lack of support associated with one or more components of the wireless communications network, establish, via the wireless communications link with the base station, an internet connection, transmit, via the wireless communications link and the internet connection, a discovery query for a gateway for a core network of the wireless communications network, establish, based at least in part on the discovery query and the lack of support for voice calls in accordance with the first RAT, a connection with the gateway via the internet connection, and initiate a voice call via a call path that includes the wireless communications link with the base station and the connection with the gateway.

Another apparatus for wireless communications at a UE is described. The apparatus may include means for establishing a wireless communications link with a base station of a wireless communications network, the wireless communications link in accordance with a first RAT, identifying a lack of support for voice calls in accordance with the first RAT, the lack of support associated with one or more components of the wireless communications network, establishing, via the wireless communications link with the base station, an internet connection, transmitting, via the wireless communications link and the internet connection, a discovery query for a gateway for a core network of the wireless communications network, establishing, based at least in part on the discovery query and the lack of support for voice calls in accordance with the first RAT, a connection with the gateway via the internet connection, and initiating a voice call via a call path that includes the wireless communications link with the base station and the connection with the gateway.

A non-transitory computer-readable medium storing code for wireless communications at a UE is described. The code may include instructions executable by a processor to establish a wireless communications link with a base station of a wireless communications network, the wireless communications link in accordance with a first RAT, identify a lack of support for voice calls in accordance with the first RAT, the lack of support associated with one or more components of the wireless communications network, establish, via the wireless communications link with the base station, an internet connection, transmit, via the wireless communications link and the internet connection, a discovery query for a gateway for a core network of the wireless communications network, establish, based at least in part on the discovery query and the lack of support for voice calls in accordance with the first RAT, a connection with the gateway via the internet connection, and initiate a voice call via a call path that includes the wireless communications link with the base station and the connection with the gateway.

Some examples of the method, apparatuses, and non-transitory computer-readable medium described herein may further include operations, features, means, or instructions for attempting to initiate a prior voice call via the base station in accordance with the first RAT, and completing the prior voice call via the base station in accordance with a second RAT, where identifying the lack of support for voice calls in accordance with the first RAT is based at least in part on completing the prior voice call in accordance with the second RAT.

In some examples of the method, apparatuses, and non-transitory computer-readable medium described herein, the UE may be preconfigured to disable voice calls in accordance with the first RAT, and identifying the lack of support for voice calls in accordance with the first RAT may be based at least in part on the UE being preconfigured.

Some examples of the method, apparatuses, and non-transitory computer-readable medium described herein may further include operations, features, means, or instructions for receiving, from the base station, an indication of the lack of support for voice calls in accordance with the first RAT, where identifying the lack of support for voice calls in accordance with the first RAT may be based at least in part on the indication.

In some examples of the method, apparatuses, and non-transitory computer-readable medium described herein, receiving the indication may include receiving system information, radio resource control information, or any combination thereof.

In some examples of the method, apparatuses, and non-transitory computer-readable medium described herein, the gateway for the core network may be an ePDG corresponding to a second RAT.

In some examples of the method, apparatuses, and non-transitory computer-readable medium described herein, the gateway for the core network may be an interworking function corresponding to the first RAT.

In some examples of the method, apparatuses, and non-transitory computer-readable medium described herein, initiating the voice call may be via a user plane function associated with the base station.

In some examples of the method, apparatuses, and non-transitory computer-readable medium described herein, initiating the voice call may be further via a second gateway, where the gateway may be an ePDG and the second gateway may be a PGW.

In some examples of the method, apparatuses, and non-transitory computer-readable medium described herein, initiating the voice call may be further via a user plane function associated with the gateway, where the gateway may be an interworking function corresponding to the first RAT.

In some examples of the method, apparatuses, and non-transitory computer-readable medium described herein, the lack of support for voice calls in accordance with the first RAT may include a lack of support for a QoS bearer corresponding to voice calls in accordance with the first RAT.

In some examples of the method, apparatuses, and non-transitory computer-readable medium described herein, the core network may be an IMS.

Some examples of the method, apparatuses, and non-transitory computer-readable medium described herein may further include operations, features, means, or instructions for registering with the IMS via the wireless communications link with the base station and the connection with the gateway, where initiating the voice call may be based at least in part on registering with the IMS.

Some examples of the method, apparatuses, and non-transitory computer-readable medium described herein may further include operations, features, means, or instructions for conducting the voice call based at least in part on transmitting signaling via the call path.

A method of wireless communications at a base station is described. The method may include establishing a wireless communications link with UE, where the wireless communications link is in accordance with a first RAT, and where one or more components of a wireless communications network that includes the base station lack support for voice calls in accordance with the first RAT, relaying, via the wireless communications link, signaling associated with an internet connection for the UE, relaying, via the wireless communications link and the internet connection, signaling associated with a connection between the UE and a gateway for a core network of the wireless communications network, and relaying, via the wireless communications link, signaling associated with a voice call for the UE, the voice call via a call path that includes the wireless communications link with the UE and the connection between the UE and the gateway for the core network.

An apparatus for wireless communications at a base station is described. The apparatus may include a processor, memory coupled with the processor, and instructions stored in the memory. The instructions may be executable by the processor to cause the apparatus to establish a wireless communications link with UE, where the wireless communications link is in accordance with a first RAT, and where one or more components of a wireless communications network that includes the base station lack support for voice calls in accordance with the first RAT, relay, via the wireless communications link, signaling associated with an internet connection for the UE, relay, via the wireless communications link and the internet connection, signaling associated with a connection between the UE and a gateway for a core network of the wireless communications network, and relay, via the wireless communications link, signaling associated with a voice call for the UE, the voice call via a call path that includes the wireless communications link with the UE and the connection between the UE and the gateway for the core network.

Another apparatus for wireless communications at a base station is described. The apparatus may include means for establishing a wireless communications link with UE, where the wireless communications link is in accordance with a first RAT, and where one or more components of a wireless communications network that includes the base station lack support for voice calls in accordance with the first RAT, relaying, via the wireless communications link, signaling associated with an internet connection for the UE, relaying, via the wireless communications link and the internet connection, signaling associated with a connection between the UE and a gateway for a core network of the wireless communications network, and relaying, via the wireless communications link, signaling associated with a voice call for the UE, the voice call via a call path that includes the wireless communications link with the UE and the connection between the UE and the gateway for the core network.

A non-transitory computer-readable medium storing code for wireless communications at a base station is described. The code may include instructions executable by a processor to establish a wireless communications link with UE, where the wireless communications link is in accordance with a first RAT, and where one or more components of a wireless communications network that includes the base station lack support for voice calls in accordance with the first RAT, relay, via the wireless communications link, signaling associated with an internet connection for the UE, relay, via the wireless communications link and the internet connection, signaling associated with a connection between the UE and a gateway for a core network of the wireless communications network, and relay, via the wireless communications link, signaling associated with a voice call for the UE, the voice call via a call path that includes the wireless communications link with the UE and the connection between the UE and the gateway for the core network.

Some examples of the method, apparatuses, and non-transitory computer-readable medium described herein may further include operations, features, means, or instructions for transmitting, to the UE, an indication of the lack of support for voice calls in accordance with the first RAT.

In some examples of the method, apparatuses, and non-transitory computer-readable medium described herein, transmitting the indication may include transmitting system information, radio resource control information, or any combination thereof.

In some examples of the method, apparatuses, and non-transitory computer-readable medium described herein, the signaling associated with the connection between the UE and the gateway may include a discovery query for the gateway.

In some examples of the method, apparatuses, and non-transitory computer-readable medium described herein, the gateway for the core network may be an ePDG corresponding to a second RAT.

In some examples of the method, apparatuses, and non-transitory computer-readable medium described herein, the gateway for the core network may be an interworking function corresponding to the first RAT.

In some examples of the method, apparatuses, and non-transitory computer-readable medium described herein, relaying the signaling associated with the voice call may be via a user plane function associated with the base station.

In some examples of the method, apparatuses, and non-transitory computer-readable medium described herein, relaying the signaling associated with the voice call may be further via a second gateway, where the gateway may be an ePDG and where the second gateway may be a PGW.

In some examples of the method, apparatuses, and non-transitory computer-readable medium described herein, relaying the signaling associated with the voice call may be further via a user plane function associated with the gateway, where the gateway may be an interworking function corresponding to the first RAT.

In some examples of the method, apparatuses, and non-transitory computer-readable medium described herein, the lack of support for voice calls in accordance with the first RAT may include a lack of support for a QoS bearer corresponding to voice calls in accordance with the first RAT.

In some examples of the method, apparatuses, and non-transitory computer-readable medium described herein, the core network may be an IMS.

Some examples of the method, apparatuses, and non-transitory computer-readable medium described herein may further include operations, features, means, or instructions for relaying, via the wireless communications link and before relaying the signaling associated with the voice call, signaling associated with a registration of the UE with the IMS.

DETAILED DESCRIPTION

Figure 1:
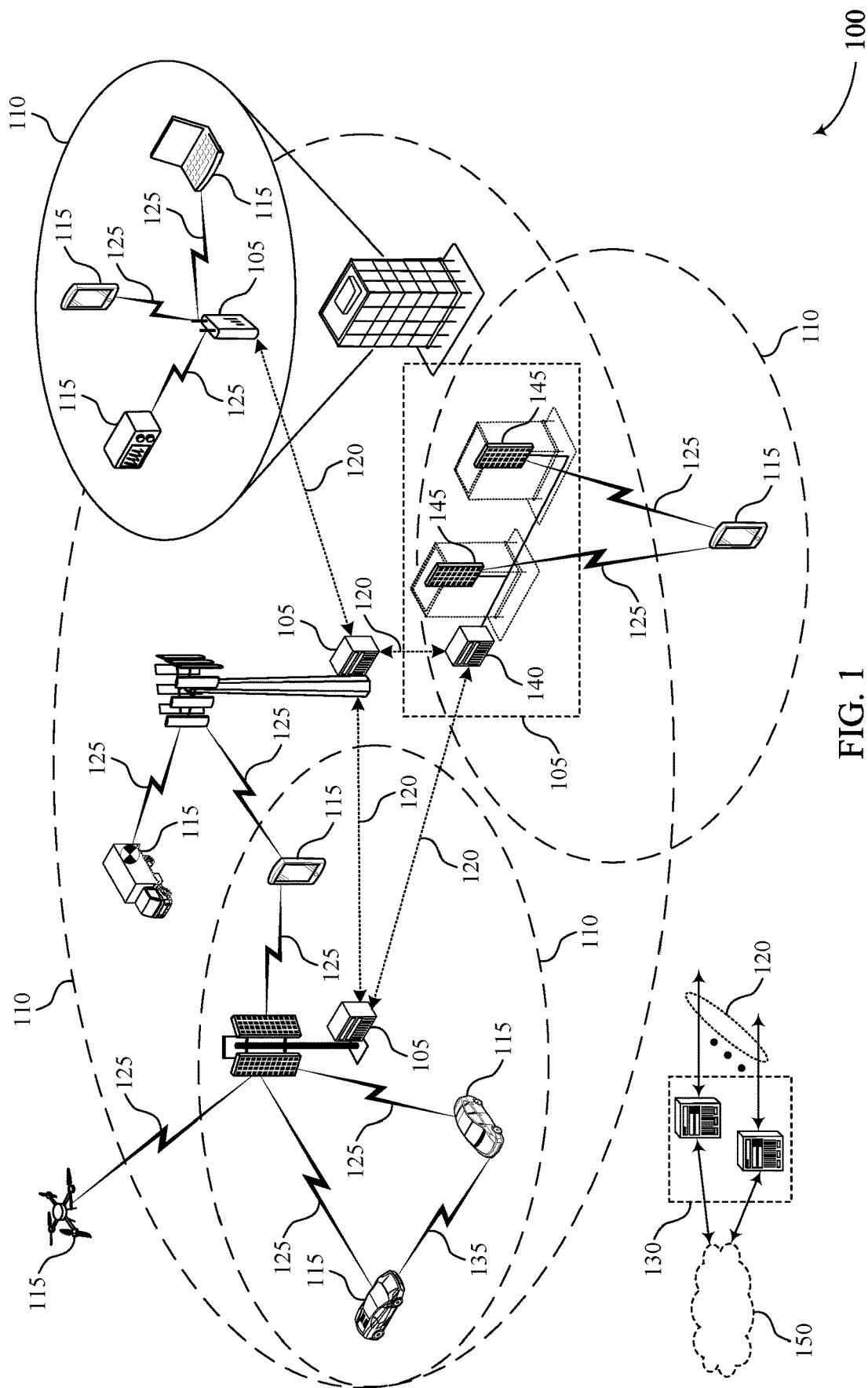
FIG. 1 illustrates an example of a system for wireless communications that supports gateway-based voice calls via a base station in accordance with aspects of the present disclosure.

A user equipment (UE) may connect with a base station, which may be part of a wireless communications system. The UE may communicate with the base station via a wireless communications link, which may be in accordance with one or more aspects of a radio access technology (RAT). The RAT and the wireless communications system may be associated with a particular generation of wireless communications technology or standard, such as fifth generation (5G) New Radio (NR).

In some examples, the wireless communications system that includes the base station may not support voice calls of a particular type, such as Voice over NR (VoNR) voice calls (e.g., the base stations or one or more other components of the network may not support voice calls of the particular type). For example, one or more components of the network may not support a quality-of-service (QoS) bearer (e.g., a radio bearer having a correlated QoS) associated with the type of voice calls. In some cases, for example, an internet protocol (IP) multimedia subsystem (IMS) core network or 5G core (5GC) network may not support a QoS bearer for the particular type of voice calls (e.g., VoNR). The wireless communications network may in some cases be a 5G standalone network, which may refer to an architecture or deployment in which both user plane and control plane signaling are in accordance with a 5G standard, and which may contribute to the lack of support for the particular type of voice calls. In contrast, for example, a non-standalone 5G network may rely on support from 4G or other prior generation network infrastructure for at least some functions, such as control plane signaling or other functions.

In some cases, if a UE attempts to perform a voice call of an unsupported type via a base station, the base station or other component of the network may initiate a fall back procedure so that the UE may make a different type of voice call that is supported by the network. For example, if the UE attempts to make a VoNR call, and the network does not support VoNR voice calls, the network (e.g., the base station) may initiate an evolved packet system (EPS) fallback or other fallback procedure after which the UE may make a Voice over LTE (VoLTE) or other type of voice call that may be supported. However, such fallback procedures may result in increased delays in setting up and completing a voice call. Additionally or alternatively, a fallback procedure (e.g., a transition between 5G connectivity and LTE connectivity between the UE and the base station) may result in an increased likelihood of a dropped call or other failure.

As described herein, however, rather than executing such a fallback procedure or making a call relying on a prior generation wireless communications link, a UE may maintain a later-generation (e.g., 5G) wireless connection with a base station and—if the base station or a network that includes the base station doesn't support voice calls in accordance with the later generation (e.g., VoNR calls)—may make a gateway-based call that leverages the later-generation wireless connection along with one or more other connections supported by the gateway.

For example, a UE may establish a 5G wireless communication link with a base station in the 5G network, and may establish an internet connection via (e.g., supported by, with IP packets traversing) the base station. The UE may identify or have identified at any time a lack of support for VoNR voice calls via the base station. The UE may transmit a discovery query for a gateway (e.g., an evolved packet data gateway (ePDG) in a 4G LTE system, or an in a 5G new radio (NR) system (an example of which may be a non-3GPP interworking function (N3IWF)). Upon successful completion of a discovery procedure for the gateway, the UE may establish a connection with the gateway via the internet connection. The gateway may in turn provide a connection to a core network that may support packet-based (e.g., IP-based) calls, such as an IMS. Thus, the base station may exchange signaling with the UE via the 5G wireless communications link, and may also exchange signaling to the gateway and thus the core network via the internet. The UE may initiate a voice call via a call path from the UE to the core network that includes the wireless communications link with the base station, and the internet connection with the gateway. In some examples, the call path may further include a packet gateway (PGW) that relays communication between the ePDG and the IMS core network. In some examples, the call path may further include another user plane function (UPF) that relays communication between the N3IWF and the IMS core network. Though the preceding and some other examples herein may be described in the context of VoNR and the use of a 5G wireless communications link despite a lack of network support for VoNR voice calls, one of ordinary skill in the art will appreciate that such techniques may be applied in the context of any RAT and a lack of support for any type of voice calls (e.g., voice calls of a same generation as the RAT).

Particular aspects of the subject matter described herein may be implemented to realize one or more advantages. For example, a device may take advantage of the increased throughput or reliability of a 5G system (e.g., the use of a 5G wireless communications link relative to the use of LTE or other types of wireless communications links) and the increased mobility of a cellular network and base station connectivity (e.g., the use of a 5G wireless communications link as opposed to a Wi-Fi connection or other type of internet connection), while avoiding dropped calls, increased latency, or other drawbacks of various fallback procedures (e.g., falling back to a 4G system), even when VoNR voice calls are not supported by a base station or cell in which the device operates. Thus, the described techniques may provide for increased throughput, improved quality or reliability of communications, increased mobility, improved user experience, or any combination thereof, among other benefits that may be appreciated by one of ordinary skill in the art.

Aspects of the disclosure are initially described in the context of wireless communications systems. Aspects of the disclosure are further illustrated by and described with reference to flow diagrams and process flows. Aspects of the disclosure are further illustrated by and described with reference to apparatus diagrams, system diagrams, and flowcharts that relate to gateway-based voice calls via a base station.

FIG. 1 illustrates an example of a wireless communications system 100 that supports gateway-based voice calls via a base station in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, IP connectivity, and other access, routing, or mobility functions. The core network 130 may be an evolved packet core (EPC) or 5GC, which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the internet, intranet(s), an IMS, or a Packet-Switched Streaming Service. A gateway such as an ePDG or N3IWF may connect to IP services 150 (e.g., to the Internet, to the IMS).

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may connect to a gateway (e.g., an ePDG, which may be included in or otherwise associated with a 4G LTE system or core network, or an interworking function (e.g., a non-3GPP interworking function (N3IWF)), which may be included in or otherwise associated with a 5G NR system). For example, the UE 115 may establish a wireless communication link with a base station 105 via a wireless communications link 125 that conforms to one or more aspects of a 5G standard and thus may be referred to as a 5G wireless communications link 125. In some examples, the UE 115 may establish an internet connection via the base station 105 (e.g., using the 5G wireless communications link 125). The UE 115 may identify or have identified at any time a lack of support for VoNR voice calls via the base station 105 (e.g., based on a lack of support for a radio bearer with an associated QoS at the base station 105 or any other component of the wireless communication system 100).

The UE 115 may transmit (e.g., via the internet connection, and thus also via the 5G wireless communications link 125) a discovery query for a gateway (e.g., the ePDG or an interworking function such as the N3IWF). Upon successful completion of a discovery procedure, which may follow or include the discovery query, the UE 115 may establish a connection with the gateway via the internet connection. The base station 105 may relay communications, using a user plane function, between the UE and the gateway via the 5G wireless communications link 125 and the internet. The UE 115 may initiate and execute a voice call, using the IMS core network, via a call path that includes the 5G wireless communications link 125, the internet connection with the gateway, and one or more connections between the gateway and the IMS. In some examples (e.g., a 4G LTE system), the call path may further include a connection between the ePDG and a PGW and a connection between the PGW and the IMS, where the PGW may relay communication between the ePDG and the IMS core network. In some examples (e.g., a 5G NR system), the call path may further include another UPF (e.g., at or coupled with the N3IWF) that relays communication between the N3IWF and the IMS core network.

Figure 2:
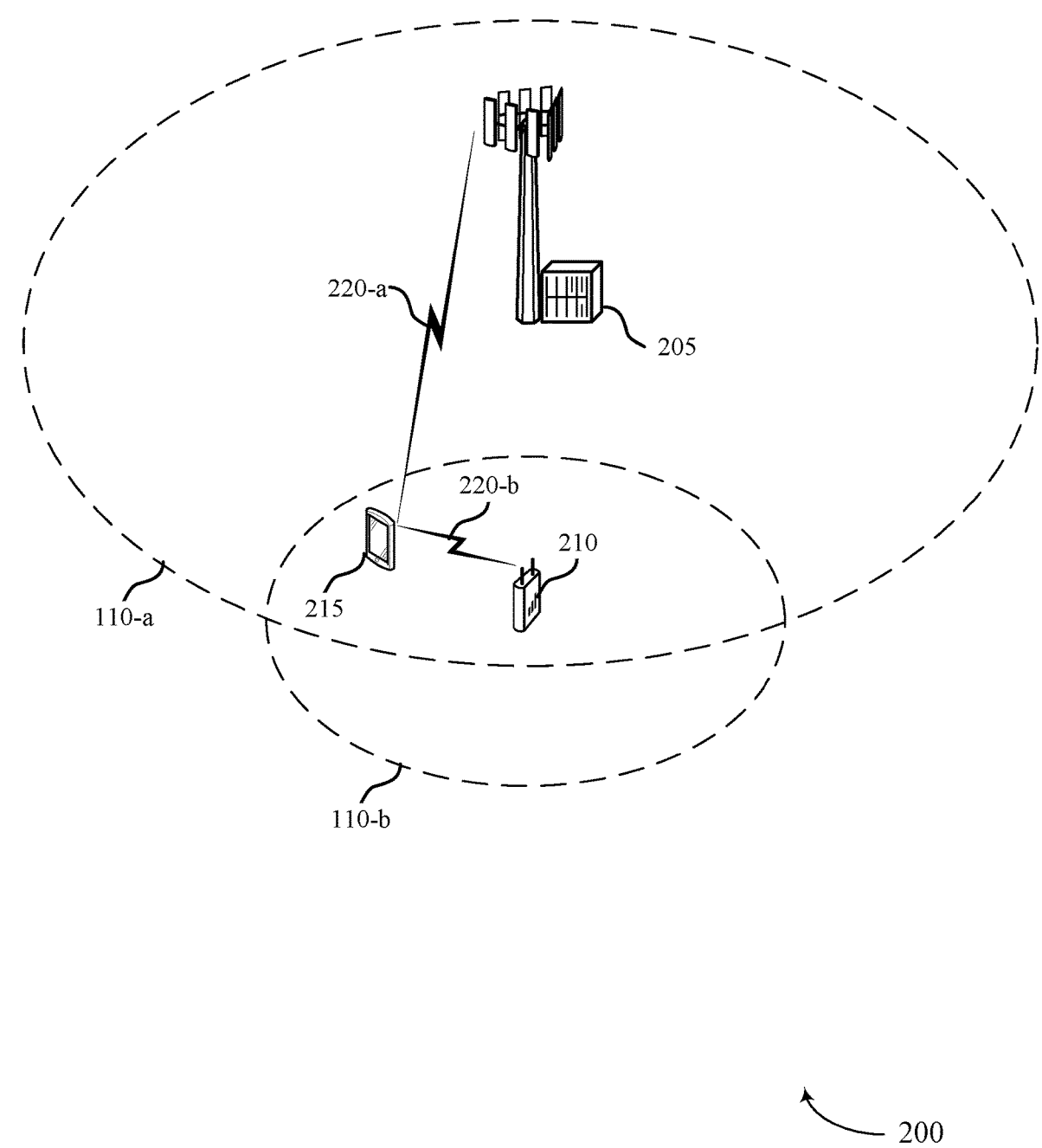
FIG. 2 illustrates an example of a wireless communications system that supports gateway-based voice calls via a base station in accordance with aspects of the present disclosure.

FIG. 2 illustrates an example of a wireless communications system 200 that supports gateway-based voice calls via a base station in accordance with aspects of the present disclosure. In some examples, wireless communications system 200 may implement aspects of wireless communication system 100. Wireless communications system 200 may include a base station 205, a UE 215, and an access point (AP) 210, which may be examples of corresponding devices described with reference to FIG. 1.

Base station 205 may be in communication with one or more devices. For example, base station 205 may serve one or more UEs 215 located within geographic coverage area 110-a. In some examples, base station 205 may be part of a 5G standalone network. 5G NR services provided by a network including base station 205 may provide increased throughput, increased mobility, high quality of service, and the like. In some examples, base station 205 may be in communication with one or more user plan functions (UPFs). The UPFs may be associated with or located at one or more network nodes (e.g., base station 205 or other base stations). UPFs may provide packet classification, aggregation, forwarding, routing, policy enforcement, and data buffering functionality as well as other functions.

AP 210 may serve one or more devices (e.g., UEs 215) located within geographic coverage area 110-b. UE 215 may be located within both geographic coverage area 110a and geographic coverage area 110-b, and may thus take advantage of services provided by both base station 205 and AP 210.

In some examples, UE 215 may attempt to initiate a voice call. If base station 205 supports voice over NR (VoNR) services, then base station 205 may relay signaling associated with the voice call directly to a core network (e.g., an IMS core network) via a first UPF. However, in some examples, base station 205 or another aspect of the wireless communications system 200 may not support VoNR voice calls.

In some cases, if base station 205 or another aspect of the wireless communications system 200 does not support VoNR voice calls, then to initiate a voice call, UE 215 may rely on a fallback procedure. That is, UE 215 may fall back from the 5G network to a 4G LTE network (e.g., may perform an EPS fallback procedure). For example, illustrated wireless communications link 220 may be in accordance with aspects of a first RAT (e.g., a 5G RAT), and the UE 215 may transition to a different link in accordance with a different RAT (e.g., an LTE RAT), for at least the purpose of initiating and conducting a voice call via the different link. However, while performing the fallback procedure, UE 215 may experience increased delay and system latency resulting from the transition between RATs. Additionally, the voice call may be dropped as a result of the transition. Such delays and failed calls may result in decreased user experience, and increased system latency. A replacement (e.g., 4G LTE) communications link may also suffer from decreased throughput and quality when compared to 5G communications link 220-a.

As an alternative, in some cases, if base station 205 or another aspect of the wireless communications system 200 does not support VoNR voice calls, UE 215 may attempt to initiate a voice call via a communications link 220-b with AP 210 (e.g., a Wi-Fi voice call). However, such a voice call may suffer from decreased mobility. That is, the quality or success of the voice call may be reliant on localized service from AP 210, which may decrease mobility for UE 215, reliability of the voice call, or the like (e.g., relative to use of wireless communications link 220-a, as base station 205 may be one of many base stations included in wireless communications system 200 and wireless communications system 200 may support a high degree of mobility for UE 215). Communications link 220-b may also suffer from decreased throughput and quality when compared to 5G communications link 220-a.

To take advantage of the increased throughput and freedom of mobility provided by a 5G RAT, even where VoNR is not supported by wireless communications system 200, UE 215 may maintain 5G communications link 220-a while establishing an internet connection with a gateway via base station 205, and UE 215 may then initiate and conduct a voice call via the gateway while continuing to use 5G communications link 220-a as part of the call path.

Figure 3:
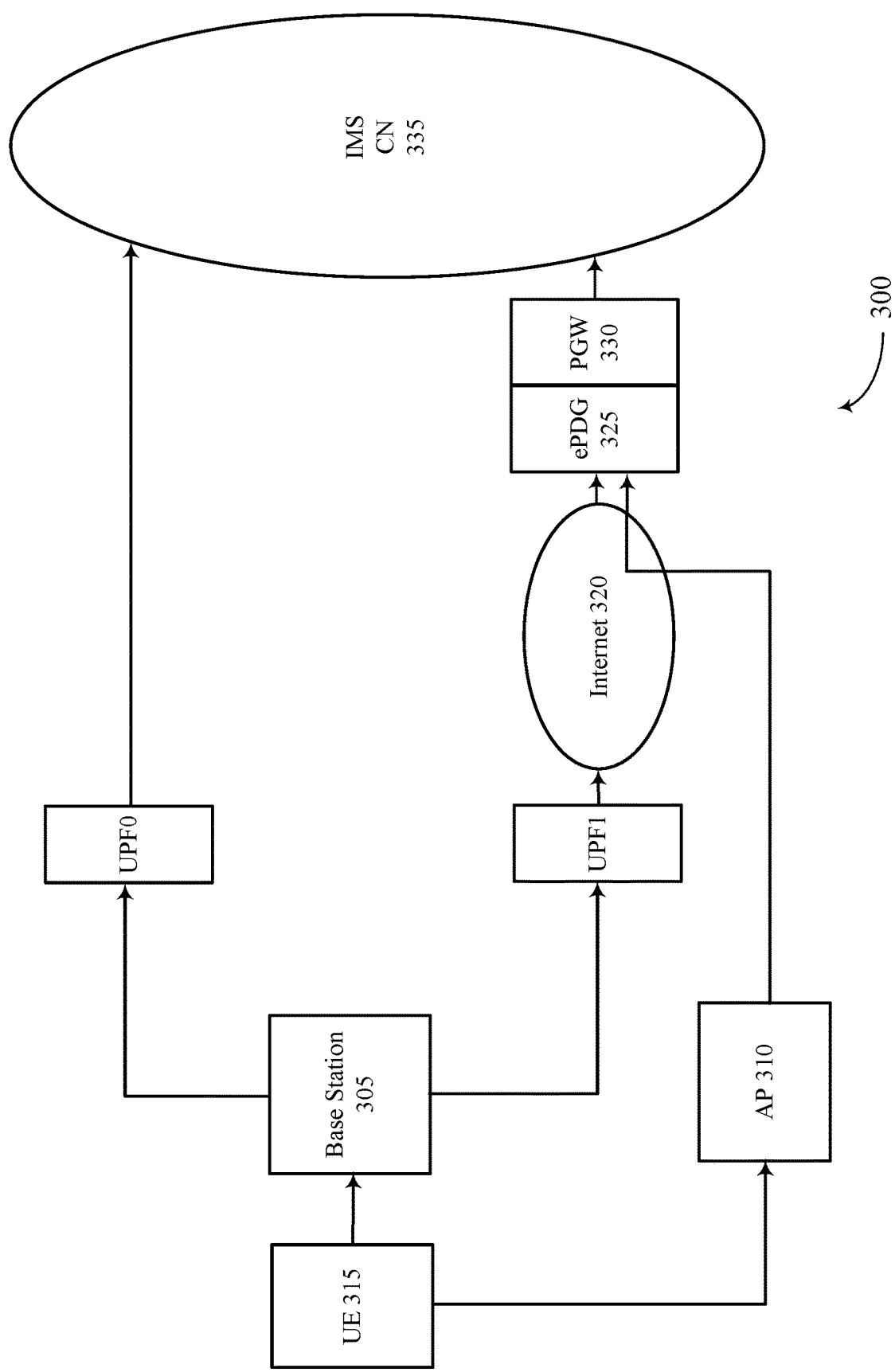
FIG. 3 illustrates a block diagram for an example of a system that supports gateway-based voice calls via a base station in accordance with aspects of the present disclosure.

FIG. 3 illustrates a block diagram 300 for an example of a system that supports gateway-based voice calls via a base station in accordance with aspects of the present disclosure. In some examples, the system in block diagram 300 may implement aspects of wireless communication system 100. The system in block diagram 300 may include a UE 315, an AP 310, and a base station 305, which may be examples of corresponding devices described with reference to FIG. 1 and FIG. 2.

If the system supports VoNR voice calls, then UE 315 may initiate a VoNR call via base station 305. Base station 305 may relay signaling related to the voice call via UPFO to IMS core network 335.

In some examples, however, the system (e.g., base station 305 or any other component of the system) may not support VoNR voice calls. Further, as described herein (e.g., with reference to FIG. 2) or for other reasons, relying on AP 310 for a voice call (e.g., a Wi-Fi voice call) may be undesirable (e.g., due to mobility constraints, throughput constraints, or the like).

In some examples, as described herein, UE 315 may initiate a voice call via base station 305 and a gateway (e.g., ePDG 325) that benefits from the high throughput and increased mobility of a 5G wireless communications link with base station 305, even if base station 305 or another aspect of the system does not support VoNR voice calls. In such examples, UE 315 may identify that base station 305, a network associated with base station 305, a cell that serves UE 315, or a geographic location in which UE 315 is located, does not support VoNR voice calls via any number of techniques, such as those described in greater detail with reference to FIG. 4. In such examples, UE 315 may perform a gateway discovery procedure (e.g., may transmit a gateway discovery query to ePDG 325 over an internet connection (e.g., via internet 320)). In some examples, base station 305 may relay the gateway discovery query via UPF 1. ePDG 325 may be in communication with PGW 330, which may be in communication with IMS core network 335. Thus, UE 315 may initiate a voice call by communicating via a voice path between UE 315 and IMS core network 335. The call path may include base station 305, UPF 1, internet 320, ePDG 325, and PGW 330. Base station 305 may relay signaling associated with the voice call along the call path.

Figure 4:
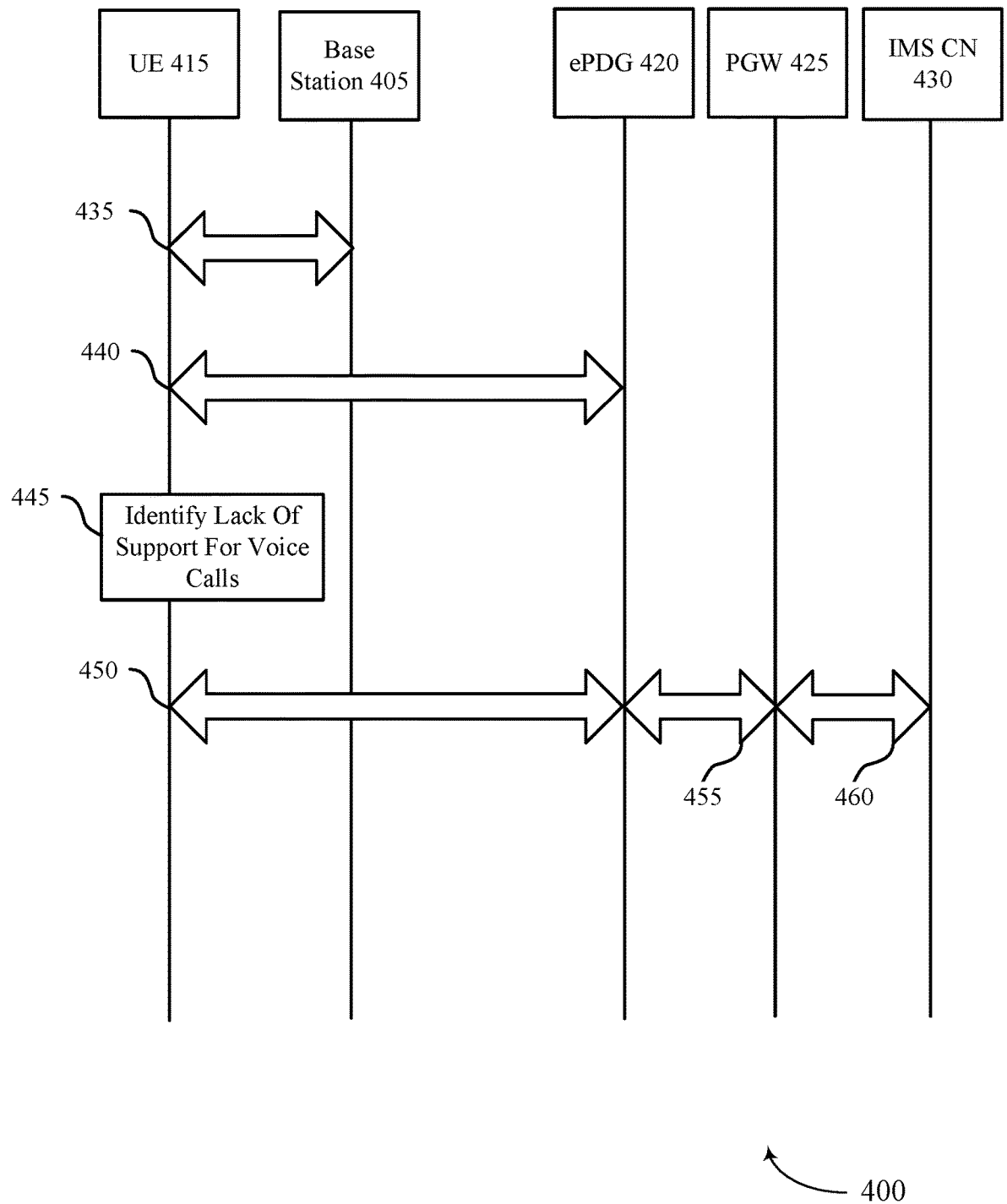
FIG. 4 illustrates an example of a process flow that supports gateway-based voice calls via a base station in accordance with aspects of the present disclosure.

FIG. 4 illustrates an example of a process flow 400 that supports gateway-based voice calls via a base station in accordance with aspects of the present disclosure. In some examples, process flow 400 may implement aspects of wireless communication system 100. In some examples, process flow 400 may be implemented by a UE 415, and a base station 405 that is part of a 5G network, and potentially by any number of other components, which may be examples of corresponding devices described with reference to FIGS. 1-3.

At 435, UE 415 may establish a wireless connection link with a 5G network via a base station 405. The wireless communications link may be in accordance with a particular radio access technology (RAT), or a particular generation communications protocol, or the like. For instance, the wireless communications link may be a 5G NR link. In some examples, at 435, UE 415 may initiate a protocol data unit (PDU) session to the internet via the wireless communications link.

At 440, UE 415 may perform an ePDG discovery procedure. For example, UE 415 may transmit a discovery query for a gateway for IMS core network 430 via the wireless communication link and the internet connection. In some examples, the gateway may be ePDG 420. ePDG 420 may be in communication via communication link 455 with PGW 425. PGW 425 may be in communication with IMS core network 430 via communication link 460. Thus, by performing the ePDG discovery at 440, UE 415 may establish a call path between UE 415 and IMS core network 430 via a base station 405 of the 5G network, ePDG 420, PGW 425.

At 445, UE 415 may identify a lack of support for voice calls in accordance with the particular RAT or particular generation protocol (e.g., VoNR voice calls). The lack of support may be associated with one or more component of the 5G network. For instance, base station 405, one or more UPFs, an entire standalone 5G network, a particular geographic location in which base station 405 is located, a serving cell associated with UE 415, or the like, may not support VoNR voice calls. The lack of support for VoNR voice calls may include a lack of support at base station 405 for QoS bearers corresponding to voice calls in accordance with 5G systems.

The order of operations illustrated in the example of FIG. 4 is not to be construed as limiting. For instance, in some examples, UE 415 may first identify the lack of support for VoNR voice calls at 445, and may subsequently perform the ePDG discovery procedure at 440 (e.g., based on having identified the lack of support for VoNR voice calls). In some examples, UE 415 may establish the wireless connection with base station 405 at 435 and perform the ePDG discovery procedure at 440 automatically or responsive to one or more scenarios. Based on identifying the lack of support at 445, UE 415 may establish the call path described at 450 and initiate a voice call at 450, based on identifying the lack of support for the 5G phone call at 445 and having previously performed the ePDG discovery procedure at 440.

In some examples, UE 415 may determine at some prior time that base station 405 does not support VoNR voice calls, and may store the relevant information. For instance, UE 415 may determine whether VoNR voice calls are supported by base station 405 based on past experience. UE 415 may attempt to initiate a voice call through a cell associated with base station 405 in the 5G network, and UE 415 may determine to or be directed to complete the voice call in accordance with a different RAT or different generation communications system (e.g., to fall back to an LTE network to perform the voice call). In such cases, UE 415 may save the cell in a list (e.g., a fallback list, which may be a look-up table). Accordingly, when UE 415 determines to attempt to initiate a voice call, UE 415 may determine whether a cell to which the UE 415 is connected in the 5G network is on the fallback list to determine whether the cell (e.g., base station 405) supports VoNR voice calls. In some cases, UE 415 may associate a time stamp with up to each cell stored in the fallback list when a cell is added, and may remove a cell from the fallback list after a defined amount of time has elapsed since the cell was added relative to a corresponding time stamp. In some examples, UE 415 associate a physical location with each cell stored in the fallback list. UE 415 may, for example, determine that it is located in a similar geographic area (e.g., within a threshold distance from the location of the base station) with a base station 405 with which it previously attempted to perform a VoNR voice call. Based on the location, UE 415 may determine that the current base station 405 with which it has established a communication link at 435 also does not support VoNR voice calls (e.g., because both base stations 405 are located within a city or geographic area supported by a 5G standalone system that does not support VoNR voice calls).

In some examples, UE 415 may be preconfigured with VoNR voice calls enabled or disabled. For instance, a network operator for a network that does not support VoNR voice calls may configure UE 415 to disable VoNR voice calls. In such examples, at 445, UE 415 may identify the lack of support for VoNR voice calls based on the preconfiguration.

In some examples, base station 405 may explicitly indicate the lack of support for VoNR voice calls. For instance, base station 405 may transmit, to UE 415, an indication of the lack of support for voice calls in accordance with the particular (e.g., initial, first) RAT or particular (e.g., initial, first) generation protocol (e.g., VoNR voice calls). Base station 405 may indicate the lack of support for 5G voice calls via system information (e.g., a system information block (SIB)), higher layer signaling (e.g., radio resource control (RRC) signaling), or a combination thereof.

Having identified the lack of support for VoNR voice calls, at 450, UE 415 may initiate a voice call via a call path between UE 415 and IMS core network 430 including base station 405, ePDG 420, and PGW 425 as associated communications links between or otherwise supported by such components. That is, UE 415 may initiate a voice call with base station 405 at least in part over the established wireless communications link with base station 405. Base station 405 may exchange signaling associated with the voice call with UE 415 via the wireless communications link established at 435, and base station 405 may also relay signaling associated with the voice call over the internet connection established with ePDG 420 at 440. ePDG 420 may relay the signaling associated with the voice call to PGW 425 via communication link 455, and PGW 425 may relay the signaling associated with the voice call to IMS CN 430 via communication link 460. These components may similarly relay signaling associated with the voice call in a direction towards the UE 415. In some examples, UE 415 may register with the IMS core network 430 via the wireless communications link with base station 405 established at 435, and initiating the voice call may be based on (e.g., after or otherwise predicated upon) the registering. Having initiated the call, UE 415 may conduct the voice call via the established call path. Base station 405 and other components (e.g., ePDG 420, PGW 425, IMS CN 430) may continue to relay signaling associated with the voice call along the established call path.

Figure 5:
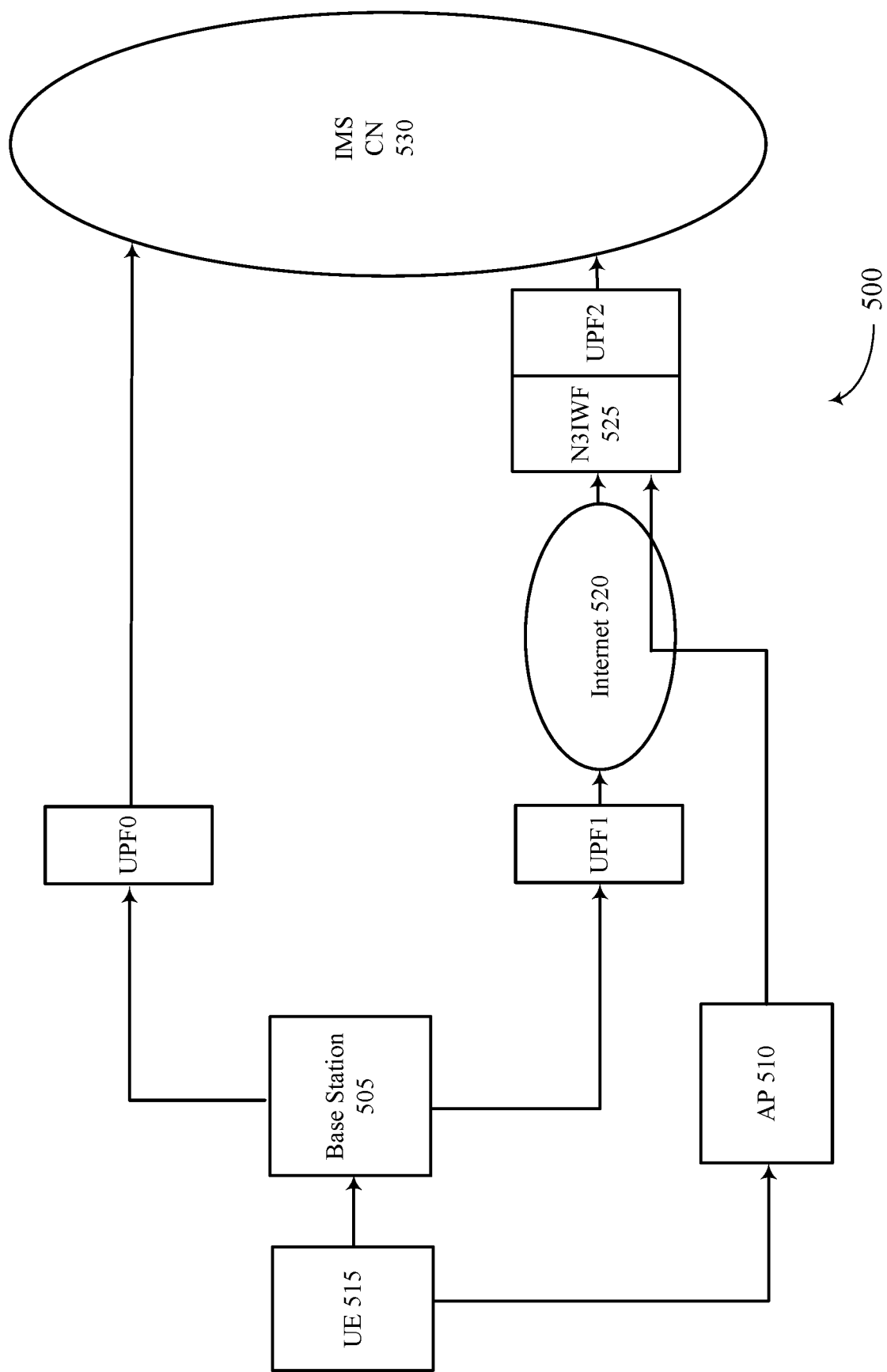
FIG. 5 illustrates a block diagram for an example of a system that supports gateway-based voice calls via a base station in accordance with aspects of the present disclosure.

FIG. 5 illustrates a block diagram 500 for an example of a system that supports gateway-based voice calls via a base station in accordance with aspects of the present disclosure. In some examples, the system in block diagram 500 may implement aspects of wireless communication system 100. The system in block diagram 500 may include a UE 515, a base station 505, and an AP 510, which may be examples of corresponding devices described with reference to FIGS. 1-4.

If the system supports VoNR voice calls, then UE 515 may initiate a VoNR call via base station 505. Base station 505 may relay signaling related to the voice call via UPF0 to IMS core network 530.

In some examples, however, the system (e.g., base station 505 or any other component of the system) may not support VoNR voice calls. Further, as described herein (e.g., with reference to FIG. 2) or for other reasons, relying on AP 310 for a voice call (e.g., a Wi-Fi voice call) may be undesirable (e.g., due to mobility constraints, throughput constraints, or the like).

In some examples, as described herein, UE 515 may initiate a voice call via base station 505 and a gateway (e.g., an interworking function such as a N3IWF 525) that benefits from the high throughput and increased mobility of a 5G wireless communications link with base station 305, even if base station 505 or another aspect of the system does not support VoNR voice calls. In such examples, UE 515 may identify that base station 505, a network associated with base station 505, a cell that serves UE 515, or a geographic location in which UE 515 is located, does not support VoNR voice calls via any number of techniques, such as those described in greater detail with reference to FIG. 6. In such examples, UE 515 may perform a gateway discovery procedure (e.g., may transmit a gateway discovery query to N3IWF 525 over an internet connection (e.g., via internet 520)). In some examples, base station 505 may relay the gateway discovery query via UPF 1. N3IWF 525 may be in communication with UPF2, which may be in communication with IMS core network 530. Thus, UE 515 may initiate a voice call by communicating via a voice path between UE 515 and IMS core network 530. The call path may include base station 505, UPF 1, internet 520, N3IWF 525, and UPF2. Base station 505 may relay signaling associated with the voice call along the call path.

Figure 6:
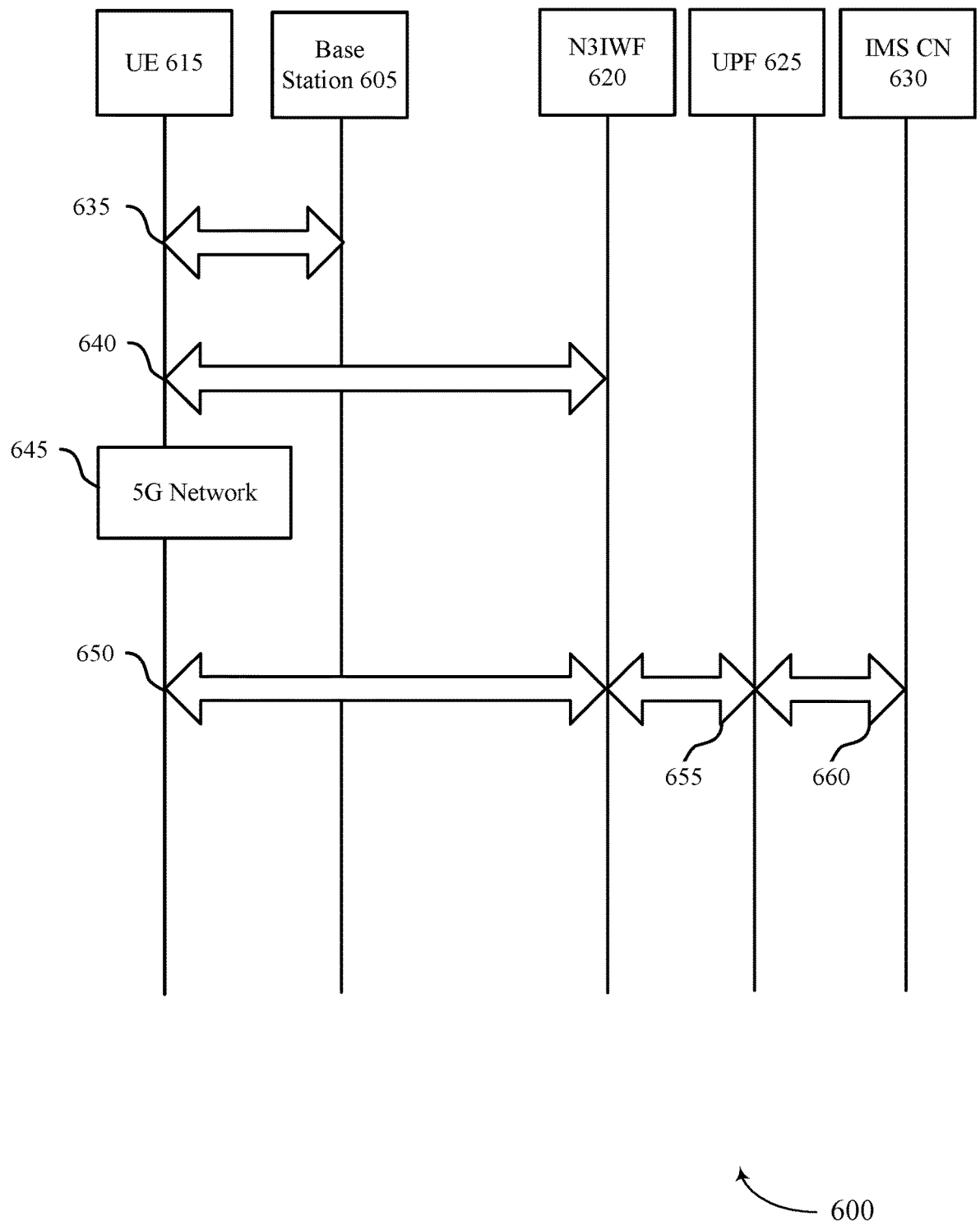
FIG. 6 illustrates an example of a process flow that supports gateway-based voice calls via a base station in accordance with aspects of the present disclosure.

FIG. 6 illustrates an example of a process flow 600 that supports gateway-based voice calls via a base station in accordance with aspects of the present disclosure. In some examples, process flow 600 may implement aspects of wireless communication system 100. Process flow 600 may be implemented by a UE 615 and a base station 605 that is part of a 5G network, and potentially along any number of other components, which may be examples of corresponding devices as described with reference to FIGS. 1-5.

At 635, UE 615 may establish a wireless connection link with a 5G network via a base station 605. The wireless communications link may be in accordance with a first RAT, or a first generation communications protocol, or the like. For instance, the wireless communications link may be a 5G NR link. In some examples, at 635, UE 615 may initiate a PDU session to the internet via the wireless communications link.

At 640, UE 615 may perform a gateway discovery procedure. For example, UE 615 may transmit a discovery query for a gateway for IMS core network 630 via the wireless communication link and the internet connection. In some examples, the gateway may be N3IWF 620. N3IWF 620 may be in communication via communication link 655 with UPF 625. UPF 625 may be in communication with IMS core network 630 via communication link 660. Thus, by performing the gateway discovery at 640, UE 615 may establish a call path between UE 615 and IMS core network 630 via a base station 605 of the 5G network, N3IWF 620, UPF 625.

At 645, UE 615 may identify a lack of support for voice calls in accordance with the first RAT or first generation protocol (e.g., VoNR voice calls). The lack of support may be associated with one or more component of the 5G network. For instance, base station 605, one or more UPFs, an entire standalone 5G network, a particular geographic location in which base station 605 is located, a serving cell associated with UE 615, or the like, may not support VoNR voice calls. The lack of support for VoNR voice calls may include a lack of support at base station 605 for QoS bearers corresponding to voice calls in accordance with 5G systems.

The order of operations illustrated in the example of FIG. 6 is not to be construed as limiting. For instance, in some examples, UE 615 may first identify the lack of support for VoNR voice calls at 645, and may subsequently perform the gateway discovery procedure at 640 (e.g., based on having identified the lack of support for VoNR voice calls). In some examples, UE 615 may establish the wireless connection with base station 605 at 635 and perform the gateway discovery procedure at 640 automatically or responsive to one or more scenarios. Based on identifying the lack of support at 645, UE 615 may establish the call path described at 650 and initiate a voice call at 650, based on identifying the lack of support for the 5G phone call at 645 and having previously performed the gateway discovery procedure at 640.

In some examples, UE 615 may determine at some prior time that base station 605 does not support VoNR voice calls, and may store the relevant information. For instance, UE 615 may determine whether VoNR voice calls are supported by base station 605 based on past experience. UE 615 may attempt to initiate a voice call through a cell associated with base station 605 in the 5G network, and UE 615 may determine to or be directed to complete the voice call in accordance with a second RAT or second generation communications system (e.g., to fall back to an LTE network to perform the voice call). In such cases, UE 615 may save the cell in a list (e.g., a fallback list, which may be a look-up table). Accordingly, when UE 615 determines to attempt to initiate a voice call, UE 615 may determine whether a cell to which the UE 615 is connected in the 5G network is on the fallback list to determine whether the cell (e.g., base station 605) supports VoNR voice calls. In some cases, UE 615 may associate a time stamp with up to each cell stored in the fallback list when a cell is added, and may remove a cell from the fallback list after a defined amount of time has elapsed since the cell was added relative to a corresponding time stamp. In some examples, UE 615 associate a physical location with each cell stored in the fallback list. UE 615 may, for example, determine that it is located in a similar geographic area (e.g., within a threshold distance from the location of the base station) with a base station 605 with which it previously attempted to perform a VoNR voice call. Based on the location, UE 615 may determine that the current base station 605 with which it has established a communication link at 635 also does not support VoNR voice calls (e.g., because both base stations 605 are located within a city or geographic area supported by a 5G standalone system that does not support VoNR voice calls).

In some examples, UE 615 may be preconfigured with VoNR voice calls enabled or disabled. For instance, an operator that does not support VoNR voice calls may configure UE 615 to disable VoNR voice calls. In such examples, at 645, UE 615 may identify the lack of support for VoNR voice calls based on the preconfiguration.

In some examples, base station 605 may explicitly indicate the lack of support for VoNR voice calls. For instance, base station 605 may transmit, to UE 615, an indication of the lack of support for voice calls in accordance with the first RAT or first generation protocol (e.g., VoNR voice calls).

Base station 605 may indicate the lack of support for 5G voice calls via system information (e.g., a SIB), higher layer signaling (e.g., RRC signaling), or a combination thereof.

Having identified the lack of support for VoNR voice calls, at 650, UE 615 may initiate a voice call via a call path between UE 615 and IMS core network 630 including base station 605, N3IWF 620, and UPF 625 as associated communications links between or otherwise supported by such components. That is, UE 615 may initiate a voice call with base station 605 at least in part over the established wireless communications link with base station 605. Base station 605 may exchange signaling associated with the voice call with UE 615 via the wireless communications link established at 635, and base station 605 may also relay signaling associated with the voice call over the internet connection established with N3IWF 620 at 640. N3IWF 620 may relay the signaling associated with the voice call to UPF 625 via communication link 655, and UPF 625 may relay the signaling associated with the voice call to IMS core network 630 via communication link 660. These components may similarly relay signaling associated with the voice call in a direction towards the UE 615. In some examples, UE 615 may register with the IMS core network 630 via the wireless communications link with base station 605 established at 635, and initiating the voice call may be based on (e.g., after or otherwise predicated upon) the registering. Having initiated the call, UE 615 may conduct the voice call via the established call path. Base station 605 and other components (e.g., ePDG 620, UPF 625, IMS core network 630) may continue to relay signaling associated with the voice call along the established call path.

Figure 7:
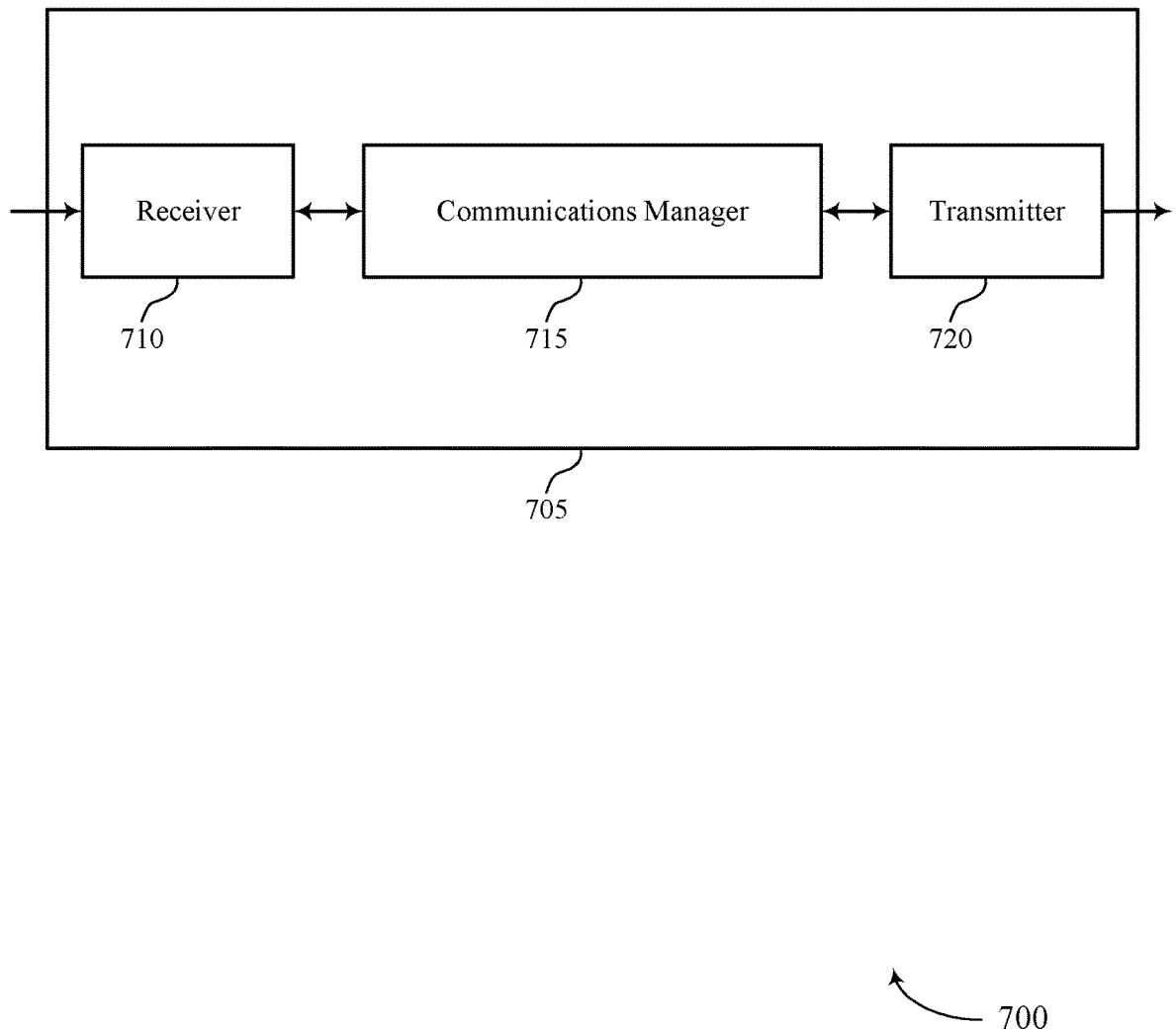
FIGS. 7 and 8 show block diagrams of devices that support gateway-based voice calls via a base station in accordance with aspects of the present disclosure.

FIG. 7 shows a block diagram 700 of a device 705 that supports gateway-based voice calls via a base station in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to gateway-based voice calls via a base station, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may establish a wireless communications link with a base station of a wireless communications network, the wireless communications link in accordance with a first RAT, identify a lack of support for voice calls in accordance with the first RAT, the lack of support associated with one or more components of the wireless communications network, establish, via the wireless communications link with the base station, an internet connection, transmit, via the wireless communications link and the internet connection, a discovery query for a gateway for a core network of the wireless communications network, establish, based on the discovery query and the lack of support for voice calls in accordance with the first RAT, a connection with the gateway via the internet connection, and initiate a voice call via a call path that includes the wireless communications link with the base station and the connection with the gateway. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

In some examples, the communications manager 715 may be implemented as an integrated circuit or chipset for a mobile device modem, and the receiver 710 and transmitter 720 may be implemented as analog components (e.g., amplifiers, filters, antennas) coupled with the mobile device modem to enable wireless transmission and reception over one or more bands.

The communications manager 715 as described herein may be implemented to realize one or more potential advantages. One implementation may allow the device to perform successful voice calls with the benefits of a 5G NR system, even where VoNR voice calls are not supported. Thus, the device may experience increased throughput, improved quality of communications, increased mobility while supporting voice calls, decreased likelihood of dropped calls or failed communication links, and improved user experience.

Figure 10:
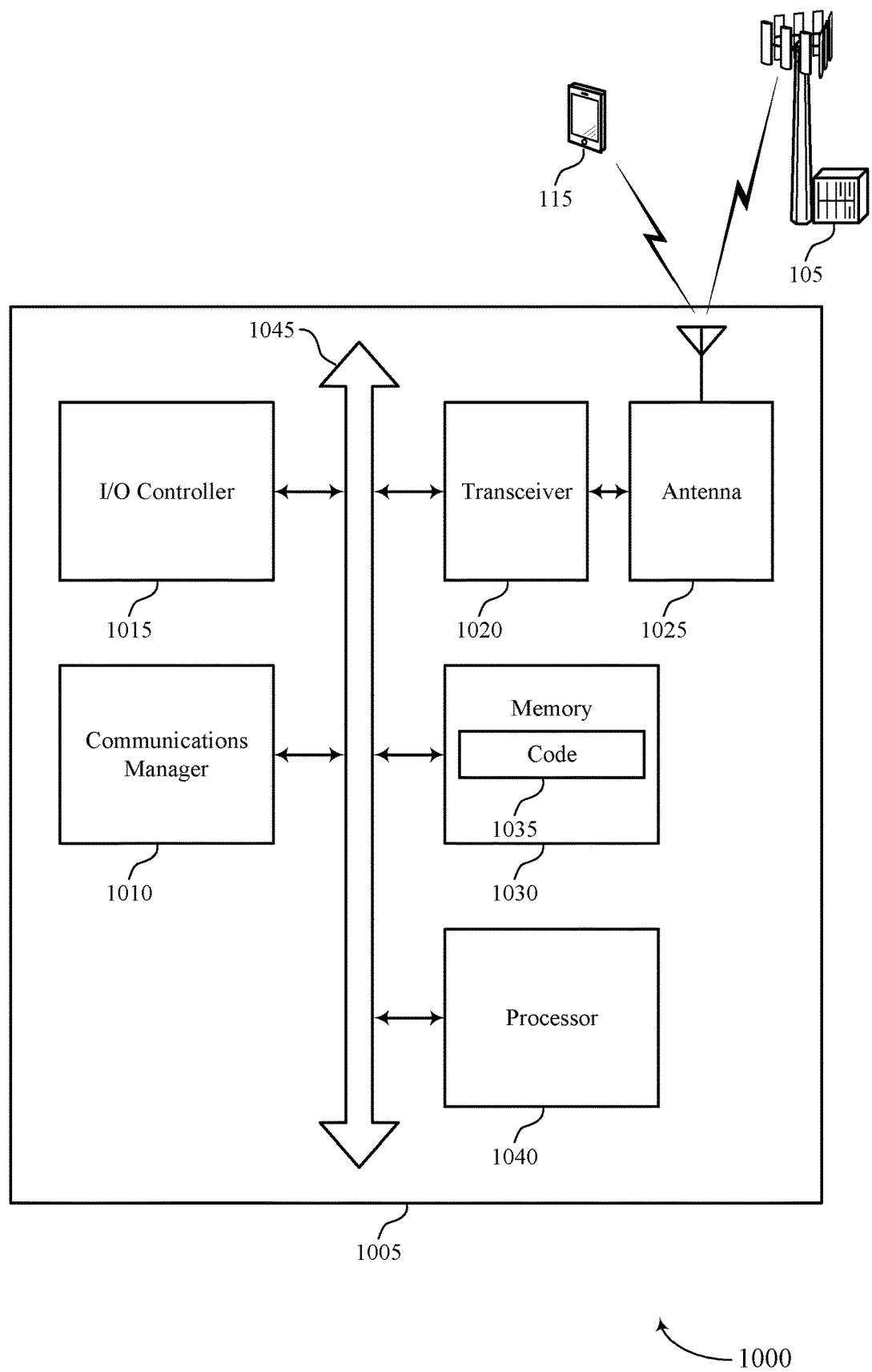
FIG. 10 shows a diagram of a system including a device that supports gateway-based voice calls via a base station in accordance with aspects of the present disclosure.

Based on techniques for efficiently communicating maximum number of layers for a device as described herein, a processor of a UE 115 (e.g., controlling the receiver 710, the transmitter 720, or a transceiver 1020 as described with respect to FIG. 10) may increase system efficiency and decrease unnecessary processing at a device.

Figure 8:
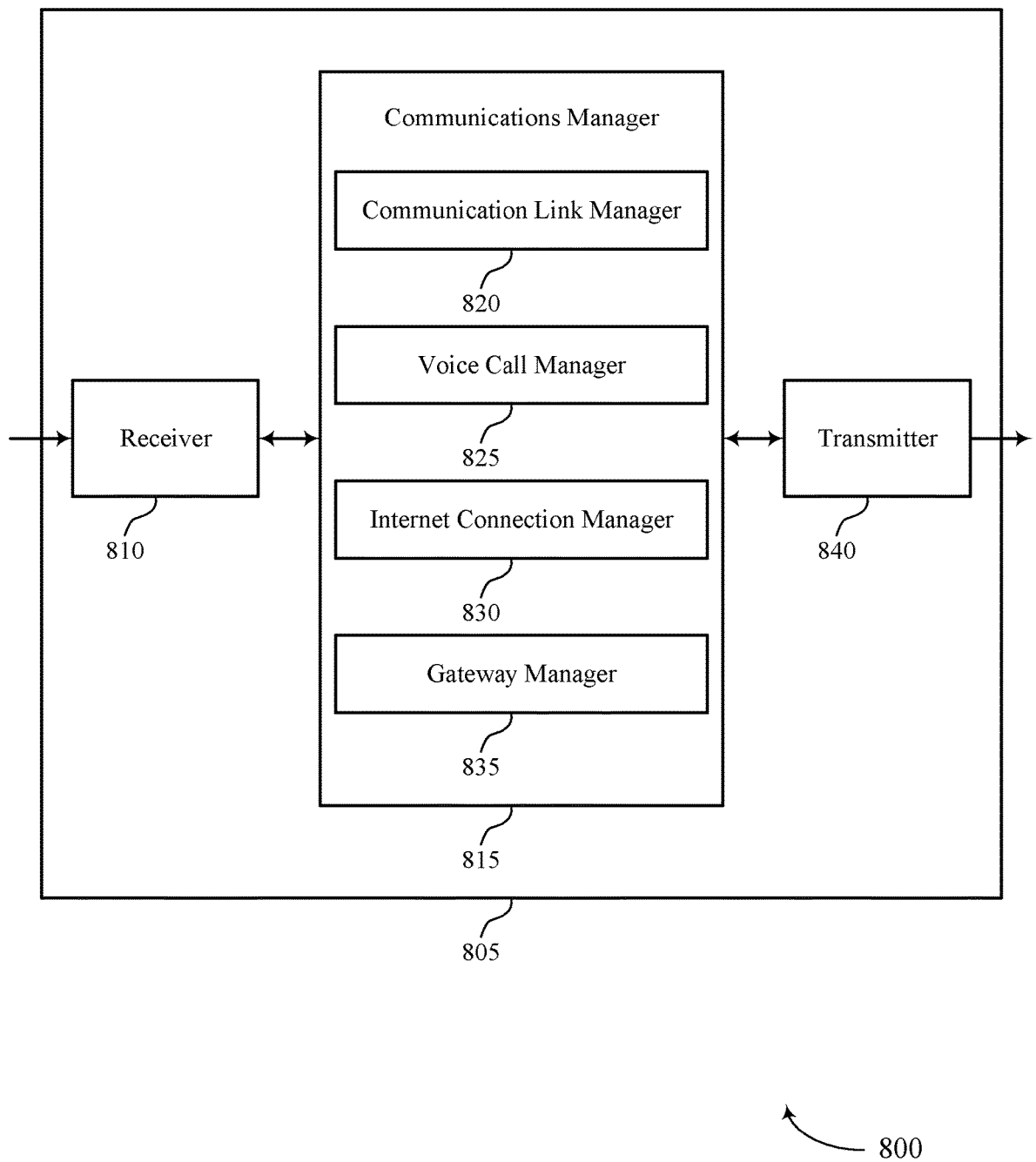

FIG. 8 shows a block diagram 800 of a device 805 that supports gateway-based voice calls via a base station in accordance with aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to gateway-based voice calls via a base station, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a communication link manager 820, a voice call manager 825, an internet connection manager 830, and a gateway manager 835. The communications manager 815 may be an example of aspects of the communications manager 1010 described herein.

The communication link manager 820 may establish a wireless communications link with a base station of a wireless communications network, the wireless communications link in accordance with a first RAT.

The voice call manager 825 may identify a lack of support for voice calls in accordance with the first RAT, the lack of support associated with one or more components of the wireless communications network.

The internet connection manager 830 may establish, via the wireless communications link with the base station, an internet connection.

The gateway manager 835 may transmit, via the wireless communications link and the internet connection, a discovery query for a gateway for a core network of the wireless communications network, and establish, based on the discovery query and the lack of support for voice calls in accordance with the first RAT, a connection with the gateway via the internet connection.

The voice call manager 825 may initiate a voice call via a call path that includes the wireless communications link with the base station and the connection with the gateway.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
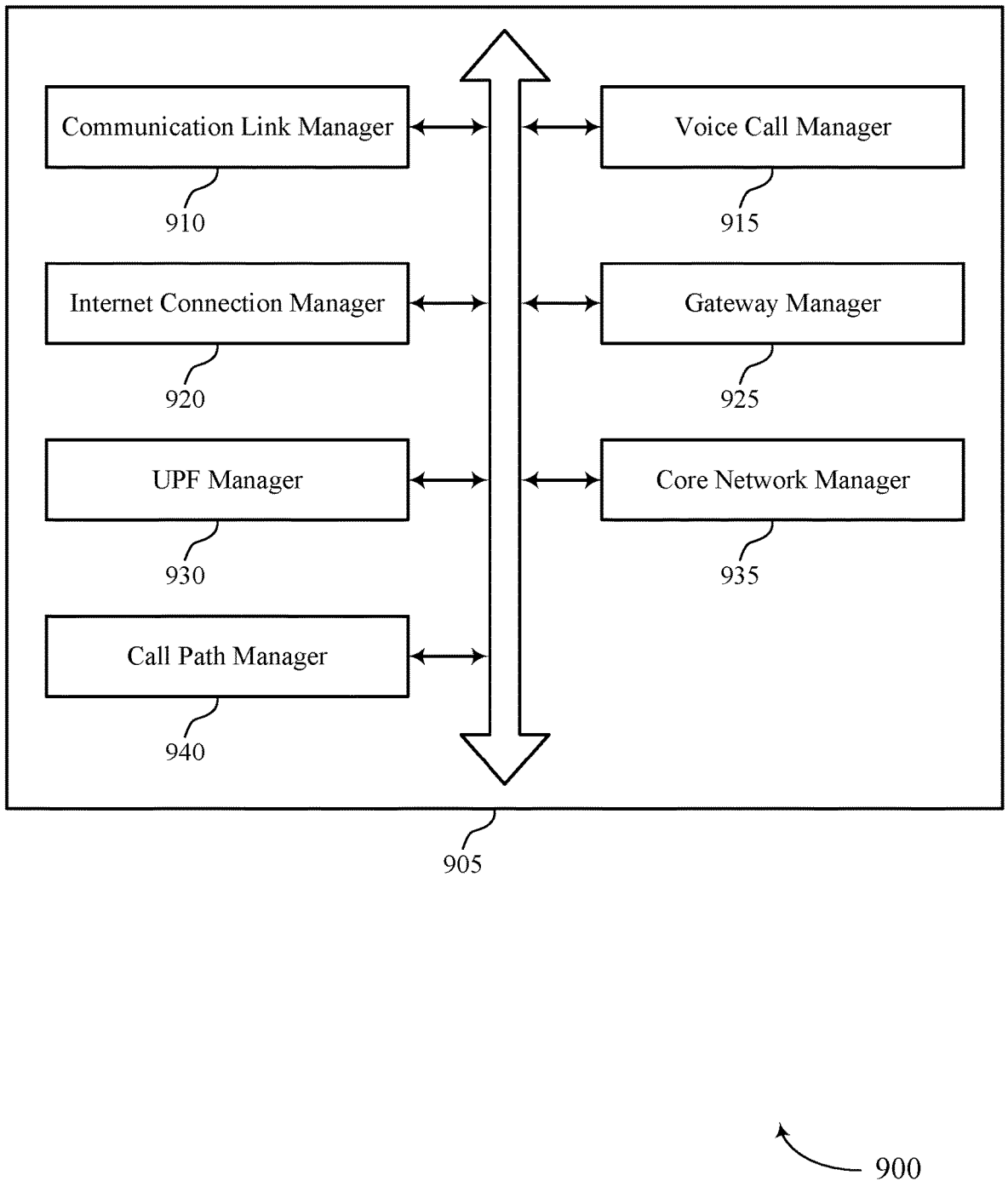
FIG. 9 shows a block diagram of a communications manager that supports gateway-based voice calls via a base station in accordance with aspects of the present disclosure.

FIG. 9 shows a block diagram 900 of a communications manager 905 that supports gateway-based voice calls via a base station in accordance with aspects of the present disclosure. The communications manager 905 may be an example of aspects of a communications manager 715, a communications manager 815, or a communications manager 1010 described herein. The communications manager 905 may include a communication link manager 910, a voice call manager 915, an internet connection manager 920, a gateway manager 925, an UPF manager 930, a core network manager 935, and a call path manager 940. Each of these modules may communicate, directly or indirectly, with one another (e.g., via one or more buses).

The communication link manager 910 may establish a wireless communications link with a base station of a wireless communications network, the wireless communications link in accordance with a first RAT.

The voice call manager 915 may identify a lack of support for voice calls in accordance with the first RAT, the lack of support associated with one or more components of the wireless communications network. In some examples, initiating a voice call via a call path that includes the wireless communications link with the base station and the connection with the gateway. In some examples, the voice call manager 915 may attempt to initiate a prior voice call via the base station in accordance with the first RAT.

In some examples, the voice call manager 915 may complete the prior voice call via the base station in accordance with a second RAT, where identifying the lack of support for voice calls in accordance with the first RAT is based on completing the prior voice call in accordance with the second RAT. In some examples, the voice call manager 915 may receive, from the base station, an indication of the lack of support for voice calls in accordance with the first RAT, where identifying the lack of support for voice calls in accordance with the first RAT is based on the indication. In some examples, receiving the indication includes receiving system information, radio resource control information, or any combination thereof. In some cases, the UE is preconfigured to disable voice calls in accordance with the first RAT, where identifying the lack of support for voice calls in accordance with the first RAT is based on the UE being preconfigured. In some cases, the lack of support for voice calls in accordance with the first RAT includes a lack of support for a quality of service (QoS) bearer corresponding to voice calls in accordance with the first RAT.

The internet connection manager 920 may establish, via the wireless communications link with the base station, an internet connection.

The gateway manager 925 may transmit, via the wireless communications link and the internet connection, a discovery query for a gateway for a core network of the wireless communications network. In some examples, the gateway manager 925 may establish, based on the discovery query and the lack of support for voice calls in accordance with the first RAT, a connection with the gateway via the internet connection. In some cases, the gateway for the core network is an ePDG corresponding to a second RAT. In some examples, initiating the voice call is further via a second gateway, where the gateway is an ePDG and where the second gateway is a PGW. In some cases, the gateway for the core network is an interworking function corresponding to the first RAT (e.g., an N3IWF).

The UPF manager 930 may establish the internet connection via a user plane function associated with the base station. In some examples, the UPF manager 930 may initiate the voice call further via a user plane function associated with the gateway, where the gateway is an interworking function corresponding to the first RAT.

The core network manager 935 may register with the IMS via the wireless communications link with the base station and the connection with the gateway, where initiating the voice call is based on registering with the IMS. In some cases, the core network includes an IMS.

The call path manager 940 may conduct the voice call based on transmitting signaling via the call path.

FIG. 10 shows a diagram of a system 1000 including a device 1005 that supports gateway-based voice calls via a base station in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may establish a wireless communications link with a base station of a wireless communications network, the wireless communications link in accordance with a first RAT, identify a lack of support for voice calls in accordance with the first RAT, the lack of support associated with one or more components of the wireless communications network, establish, via the wireless communications link with the base station, an internet connection, transmit, via the wireless communications link and the internet connection, a discovery query for a gateway for a core network of the wireless communications network, establish, based on the discovery query and the lack of support for voice calls in accordance with the first RAT, a connection with the gateway via the internet connection, and initiate a voice call via a call path that includes the wireless communications link with the base station and the connection with the gateway.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting gateway-based voice calls via a base station).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
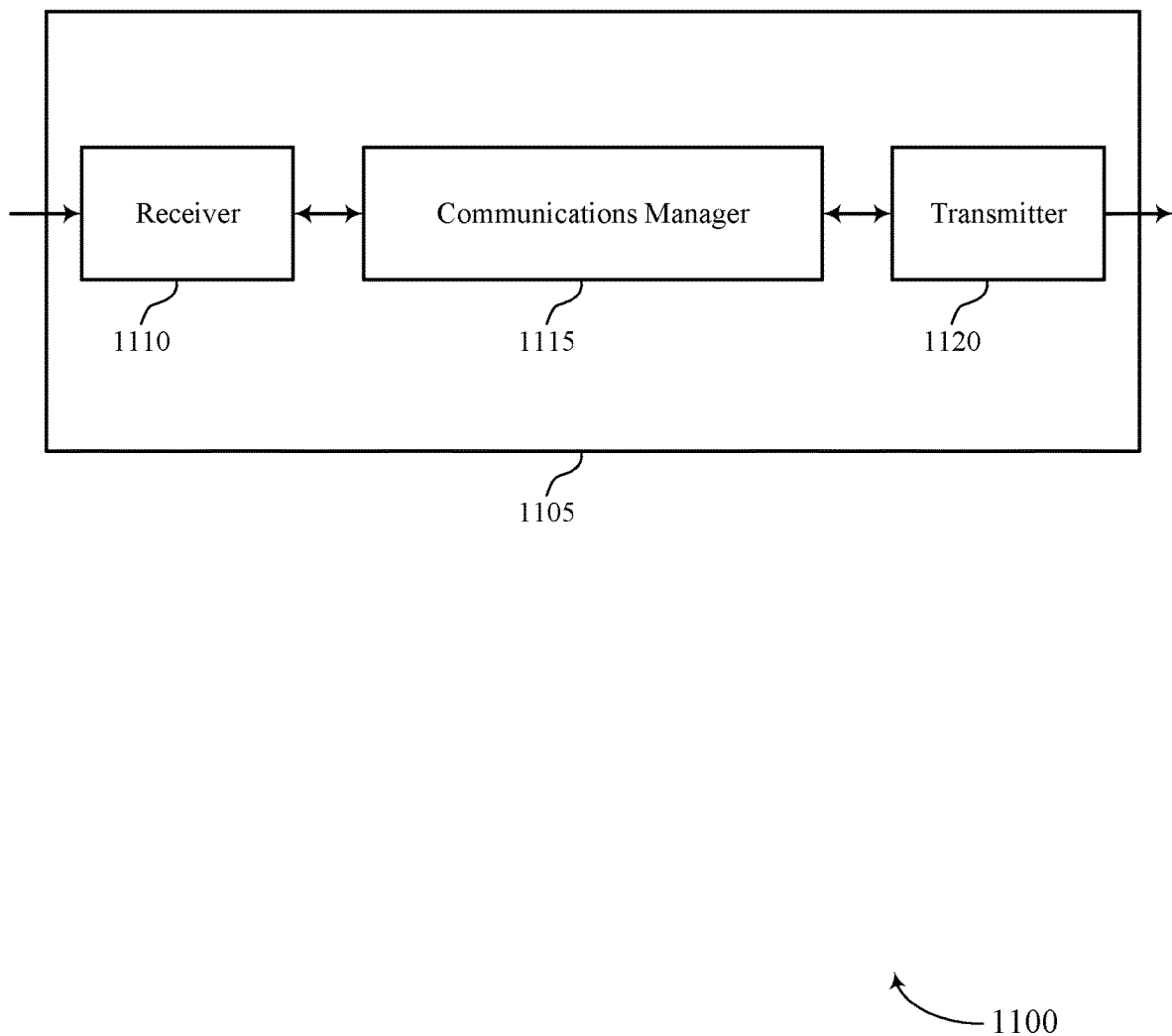
FIGS. 11 and 12 show block diagrams of devices that support gateway-based voice calls via a base station in accordance with aspects of the present disclosure.

FIG. 11 shows a block diagram 1100 of a device 1105 that supports gateway-based voice calls via a base station in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to gateway-based voice calls via a base station, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may establish a wireless communications link with a UE, where the wireless communications link is in accordance with a first RAT, and where one or more components of a wireless communications network that includes the base station lack support for voice calls in accordance with the first RAT, relay, via the wireless communications link, signaling associated with an internet connection for the UE, relay, via the wireless communications link and the internet connection, signaling associated with a connection between the UE and a gateway for a core network of the wireless communications network, and relay, via the wireless communications link, signaling associated with a voice call for the UE, the voice call via a call path that includes the wireless communications link with the UE and the connection between the UE and the gateway for the core network. The communications manager 1115 may be an example of aspects of the communications manager 1410 described herein. The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
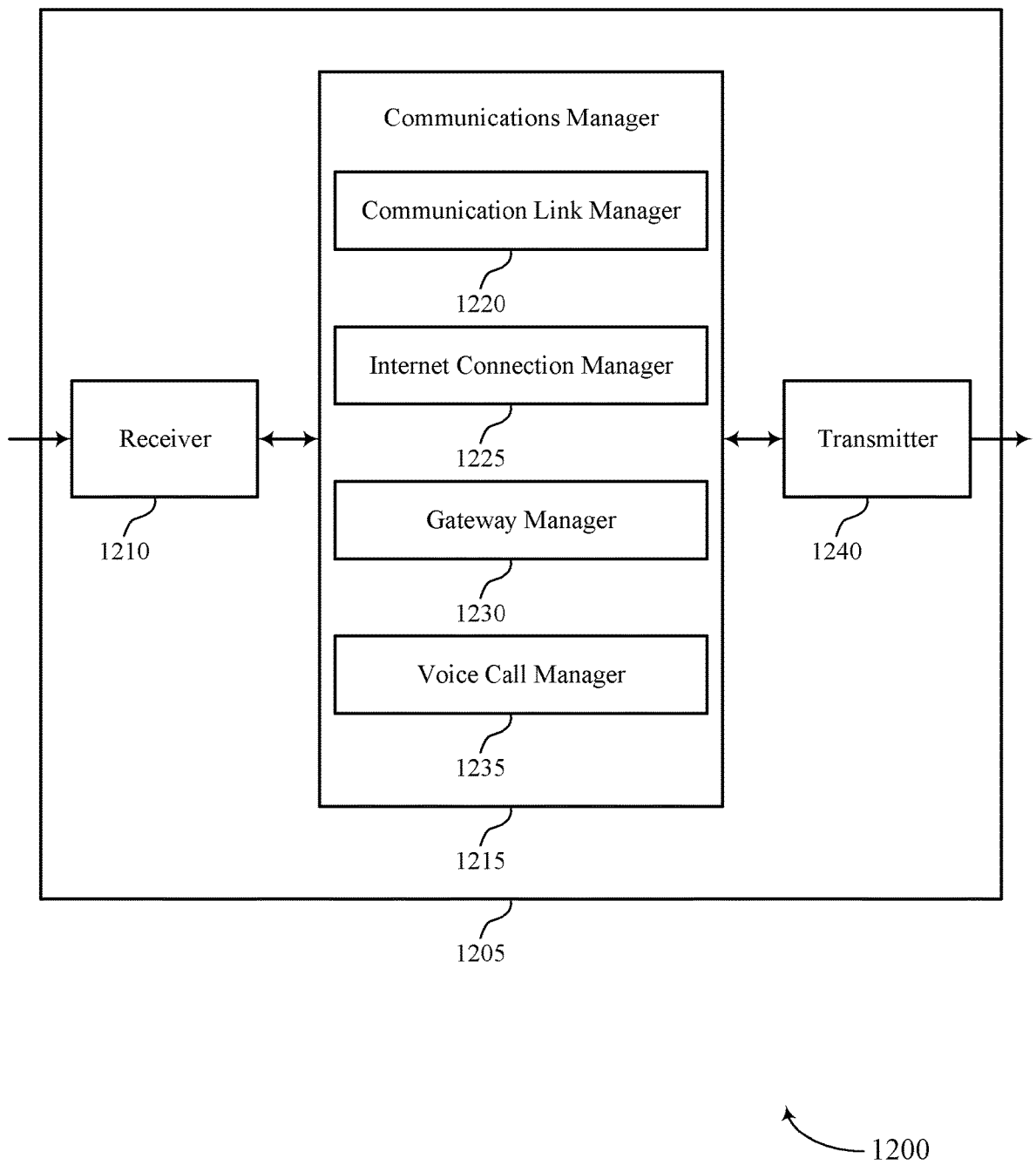

FIG. 12 shows a block diagram 1200 of a device 1205 that supports gateway-based voice calls via a base station in accordance with aspects of the present disclosure. The device 1205 may be an example of aspects of a device 1105, or a base station 105 as described herein. The device 1205 may include a receiver 1210, a communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to gateway-based voice calls via a base station, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a communication link manager 1220, an internet connection manager 1225, a gateway manager 1230, and a voice call manager 1235. The communications manager 1215 may be an example of aspects of the communications manager 1410 described herein.

The communication link manager 1220 may establish a wireless communications link with a UE, where the wireless communications link is in accordance with a first RAT, and where one or more components of a wireless communications network that includes the base station lack support for voice calls in accordance with the first RAT.

The internet connection manager 1225 may relay, via the wireless communications link, signaling associated with an internet connection for the UE.

The gateway manager 1230 may relay, via the wireless communications link and the internet connection, signaling associated with a connection between the UE and a gateway for a core network of the wireless communications network.

The voice call manager 1235 may relay, via the wireless communications link, signaling associated with a voice call for the UE, the voice call via a call path that includes the wireless communications link with the UE and the connection between the UE and the gateway for the core network.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
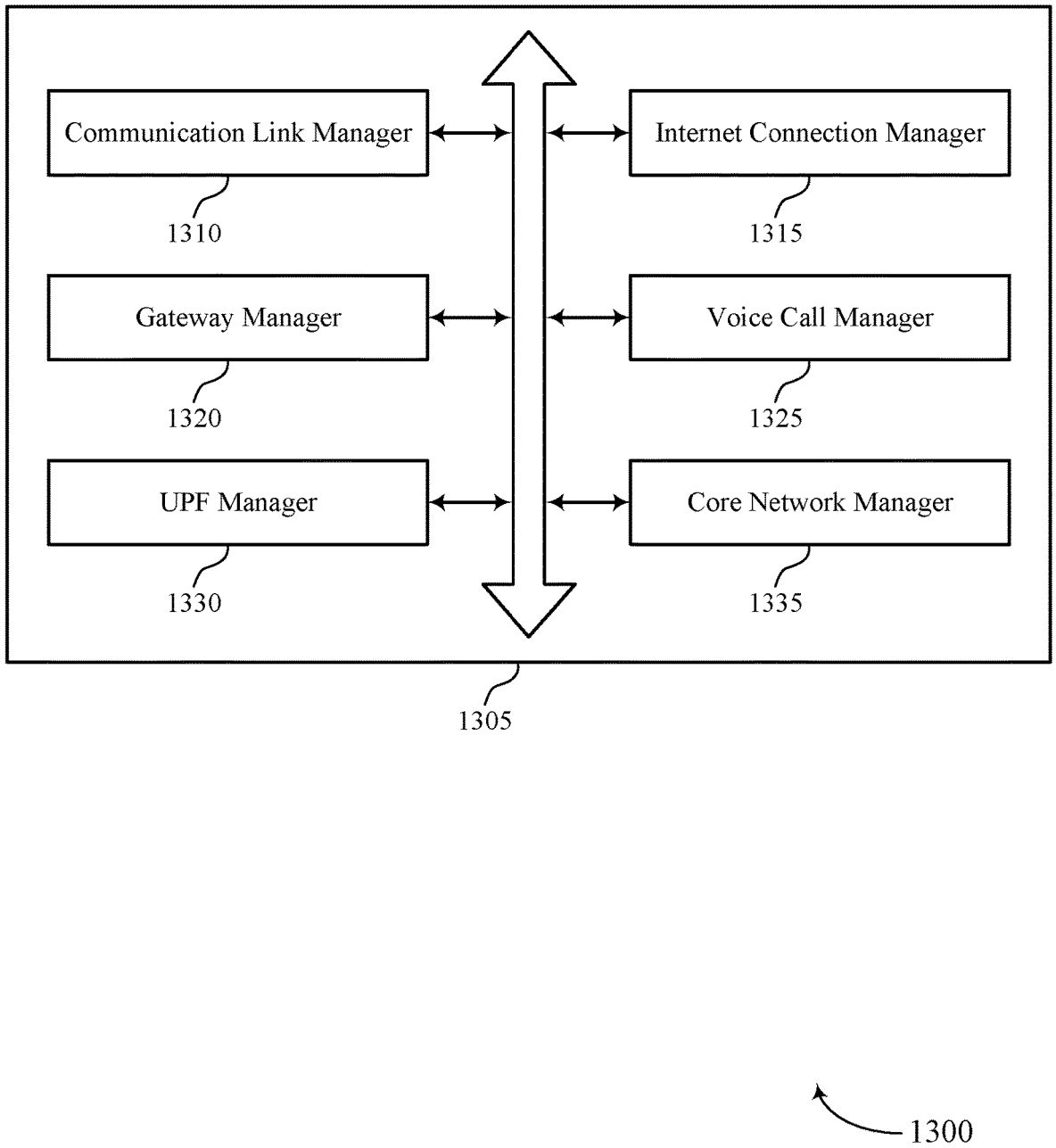
FIG. 13 shows a block diagram of a communications manager that supports gateway-based voice calls via a base station in accordance with aspects of the present disclosure.

FIG. 13 shows a block diagram 1300 of a communications manager 1305 that supports gateway-based voice calls via a base station in accordance with aspects of the present disclosure. The communications manager 1305 may be an example of aspects of a communications manager 1115, a communications manager 1215, or a communications manager 1410 described herein. The communications manager 1305 may include a communication link manager 1310, an internet connection manager 1315, a gateway manager 1320, a voice call manager 1325, an UPF manager 1330, and a core network manager 1335. Each of these modules may communicate, directly or indirectly, with one another (e.g., via one or more buses).

The communication link manager 1310 may establish a wireless communications link with a UE, where the wireless communications link is in accordance with a first RAT, and where one or more components of a wireless communications network that includes the base station lack support for voice calls in accordance with the first RAT.

The internet connection manager 1315 may relay, via the wireless communications link, signaling associated with an internet connection for the UE.

The gateway manager 1320 may relay, via the wireless communications link and the internet connection, signaling associated with a connection between the UE and a gateway for a core network of the wireless communications network. In some examples, relaying the signaling associated with the voice call is further via a second gateway, where the gateway is an ePDG and where the second gateway is a PGW. In some cases, the signaling associated with the connection between the UE and the gateway includes a discovery query for the gateway. In some cases, the gateway for the core network is an evolved packet data gateway corresponding to a second RAT. In some cases, the gateway for the core network is an interworking function corresponding to the first RAT (e.g., an N3IWF).

The voice call manager 1325 may relay, via the wireless communications link, signaling associated with a voice call for the UE, the voice call via a call path that includes the wireless communications link with the UE and the connection between the UE and the gateway for the core network. In some examples, the voice call manager 1325 may transmit, to the UE, an indication of the lack of support for voice calls in accordance with the first RAT. In some examples, transmitting the indication includes transmitting system information, radio resource control information, or any combination thereof. In some cases, the lack of support for voice calls in accordance with the first RAT includes a lack of support for a quality of service (QoS) bearer corresponding to voice calls in accordance with the first RAT.

The UPF manager 1330 may relay the signaling associated with the internet connection for the UE is via a user plane function associated with the base station. In some examples, the UPF manager 1330 may further relay the signaling associated with the voice call is via a user plane function associated with the gateway, wherein the gateway is an interworking function corresponding to the first RAT.

The core network manager 1335 may relay, via the wireless communications link and before relaying the signaling associated with the voice call, signaling associated with a registration of the UE with the IMS. In some cases, the core network includes an IMS.

Figure 14:
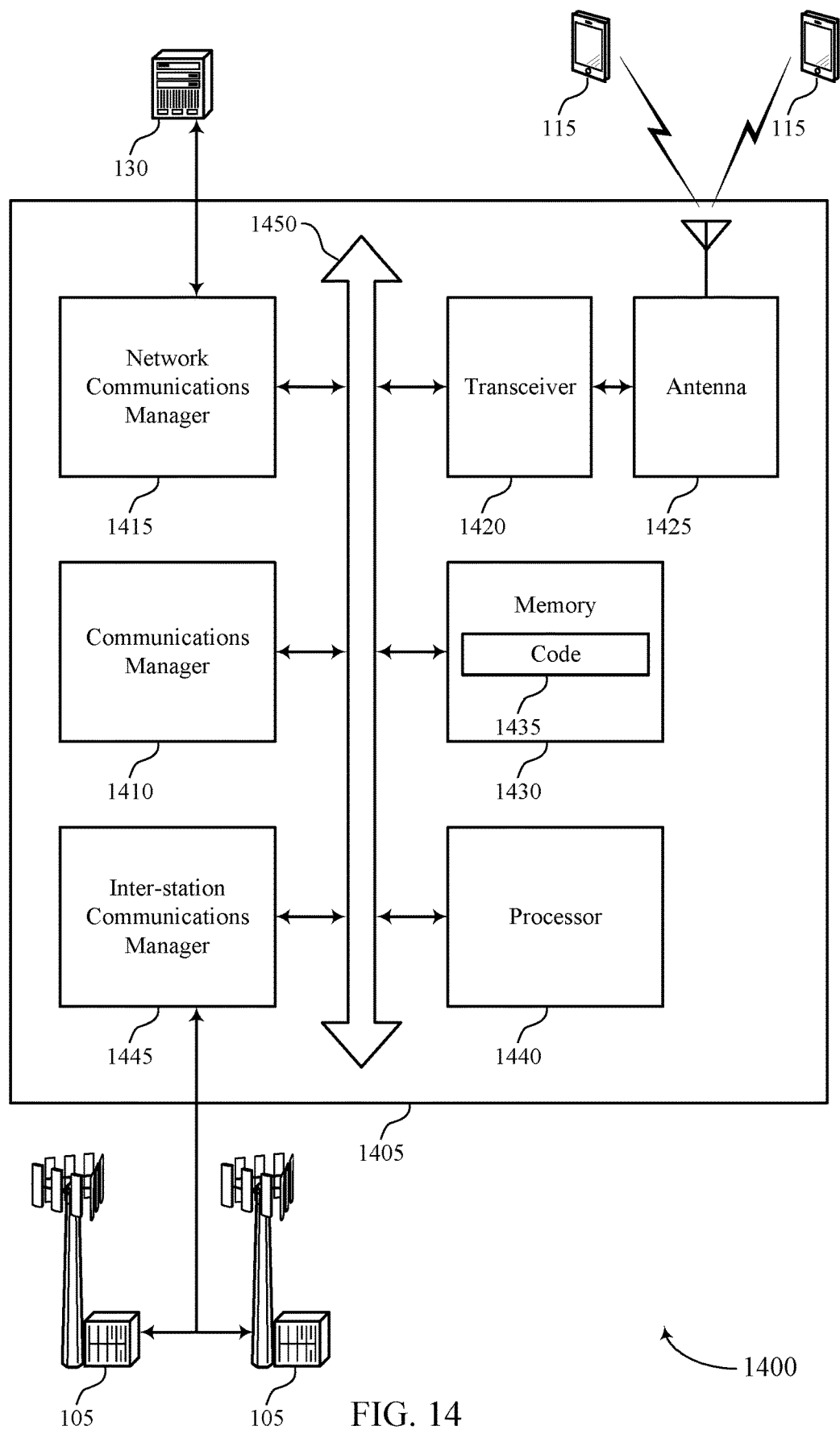
FIG. 14 shows a diagram of a system including a device that supports gateway-based voice calls via a base station in accordance with aspects of the present disclosure.

FIG. 14 shows a diagram of a system 1400 including a device 1405 that supports gateway-based voice calls via a base station in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may establish a wireless communications link with a UE, where the wireless communications link is in accordance with a first RAT, and where one or more components of a wireless communications network that includes the base station lack support for voice calls in accordance with the first RAT, relay, via the wireless communications link, signaling associated with an internet connection for the UE, relay, via the wireless communications link and the internet connection, signaling associated with a connection between the UE and a gateway for a core network of the wireless communications network, and relay, via the wireless communications link, signaling associated with a voice call for the UE, the voice call via a call path that includes the wireless communications link with the UE and the connection between the UE and the gateway for the core network.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting gateway-based voice calls via a base station).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
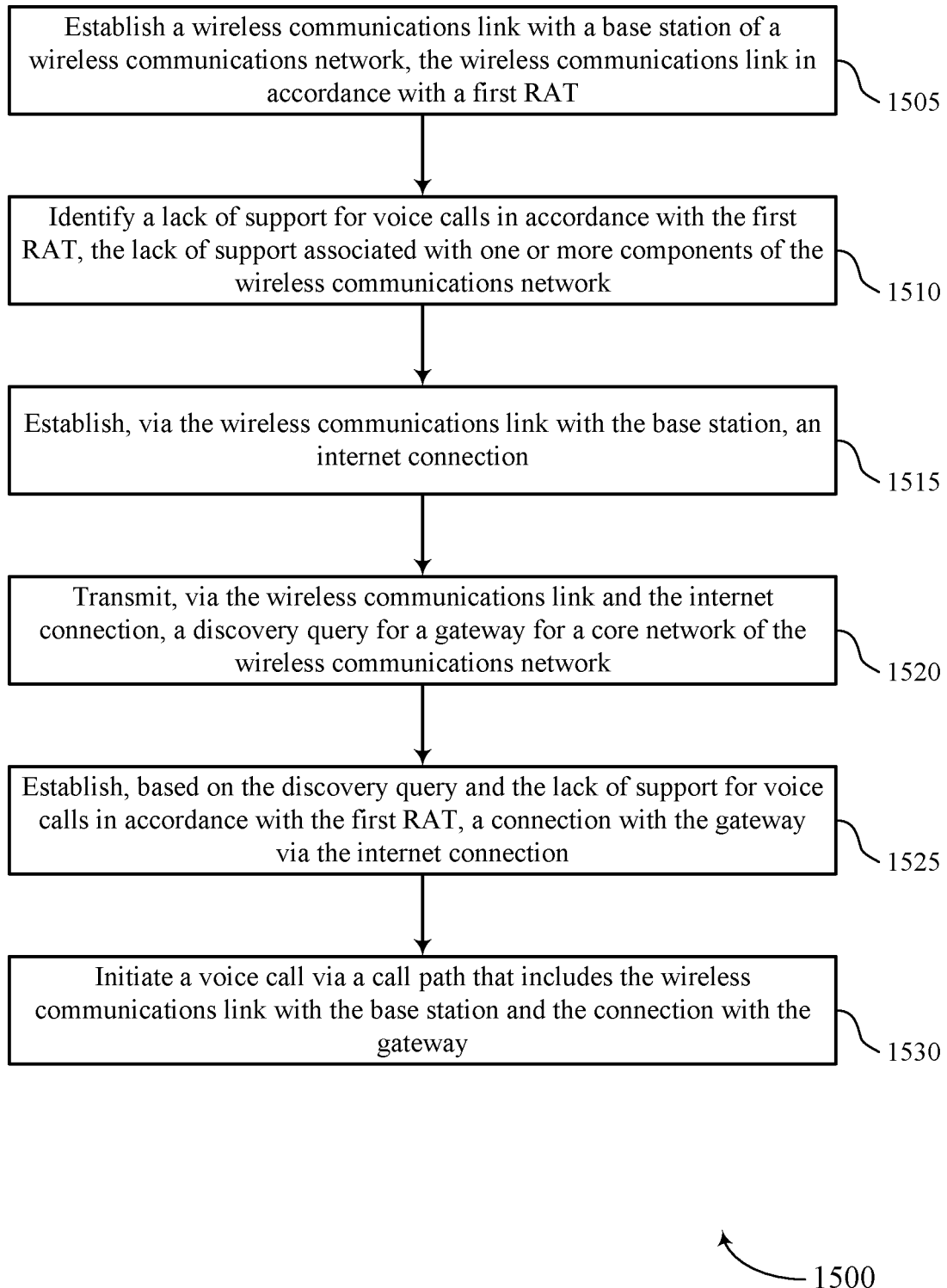
FIGS. 15 through 18 show flowcharts illustrating methods that support gateway-based voice calls via a base station in accordance with aspects of the present disclosure.

FIG. 15 shows a flowchart illustrating a method 1500 that supports gateway-based voice calls via a base station in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1505, the UE may establish a wireless communications link with a base station of a wireless communications network, the wireless communications link in accordance with a first RAT. The operations of 1505 may be performed according to the methods described herein. In some examples, aspects of the operations of 1505 may be performed by a communication link manager as described with reference to FIGS. 7 through 10. Additionally or alternatively, means for performing 1505 may, but not necessarily, include, for example, antenna 1025, transceiver 1020, communications manager 1010, memory 1030 (including code 1035), processor 1040 and/or bus 1045.

At 1510, the UE may identify a lack of support for voice calls in accordance with the first RAT, the lack of support associated with one or more components of the wireless communications network. The operations of 1510 may be performed according to the methods described herein. In some examples, aspects of the operations of 1510 may be performed by a voice call manager as described with reference to FIGS. 7 through 10. Additionally or alternatively, means for performing 1510 may, but not necessarily, include, for example, antenna 1025, transceiver 1020, communications manager 1010, memory 1030 (including code 1035), processor 1040 and/or bus 1045.

At 1515, the UE may establish, via the wireless communications link with the base station, an internet connection. The operations of 1515 may be performed according to the methods described herein. In some examples, aspects of the operations of 1515 may be performed by an internet connection manager as described with reference to FIGS. 7 through 10. Additionally or alternatively, means for performing 1515 may, but not necessarily, include, for example, antenna 1025, transceiver 1020, communications manager 1010, memory 1030 (including code 1035), processor 1040 and/or bus 1045.

At 1520, the UE may transmit, via the wireless communications link and the internet connection, a discovery query for a gateway for a core network of the wireless communications network. The operations of 1520 may be performed according to the methods described herein. In some examples, aspects of the operations of 1520 may be performed by a gateway manager as described with reference to FIGS. 7 through 10. Additionally or alternatively, means for performing 1520 may, but not necessarily, include, for example, antenna 1025, transceiver 1020, communications manager 1010, memory 1030 (including code 1035), processor 1040 and/or bus 1045.

At 1525, the UE may establish, based on the discovery query and the lack of support for voice calls in accordance with the first RAT, a connection with the gateway via the internet connection. The operations of 1525 may be performed according to the methods described herein. In some examples, aspects of the operations of 1525 may be performed by a gateway manager as described with reference to FIGS. 7 through 10. Additionally or alternatively, means for performing 1525 may, but not necessarily, include, for example, antenna 1025, transceiver 1020, communications manager 1010, memory 1030 (including code 1035), processor 1040 and/or bus 1045.

At 1530, the UE may initiate a voice call via a call path that includes the wireless communications link with the base station and the connection with the gateway. The operations of 1530 may be performed according to the methods described herein. In some examples, aspects of the operations of 1530 may be performed by a voice call manager as described with reference to FIGS. 7 through 10. Additionally or alternatively, means for performing 1530 may, but not necessarily, include, for example, antenna 1025, transceiver 1020, communications manager 1010, memory 1030 (including code 1035), processor 1040 and/or bus 1045.

Figure 16:
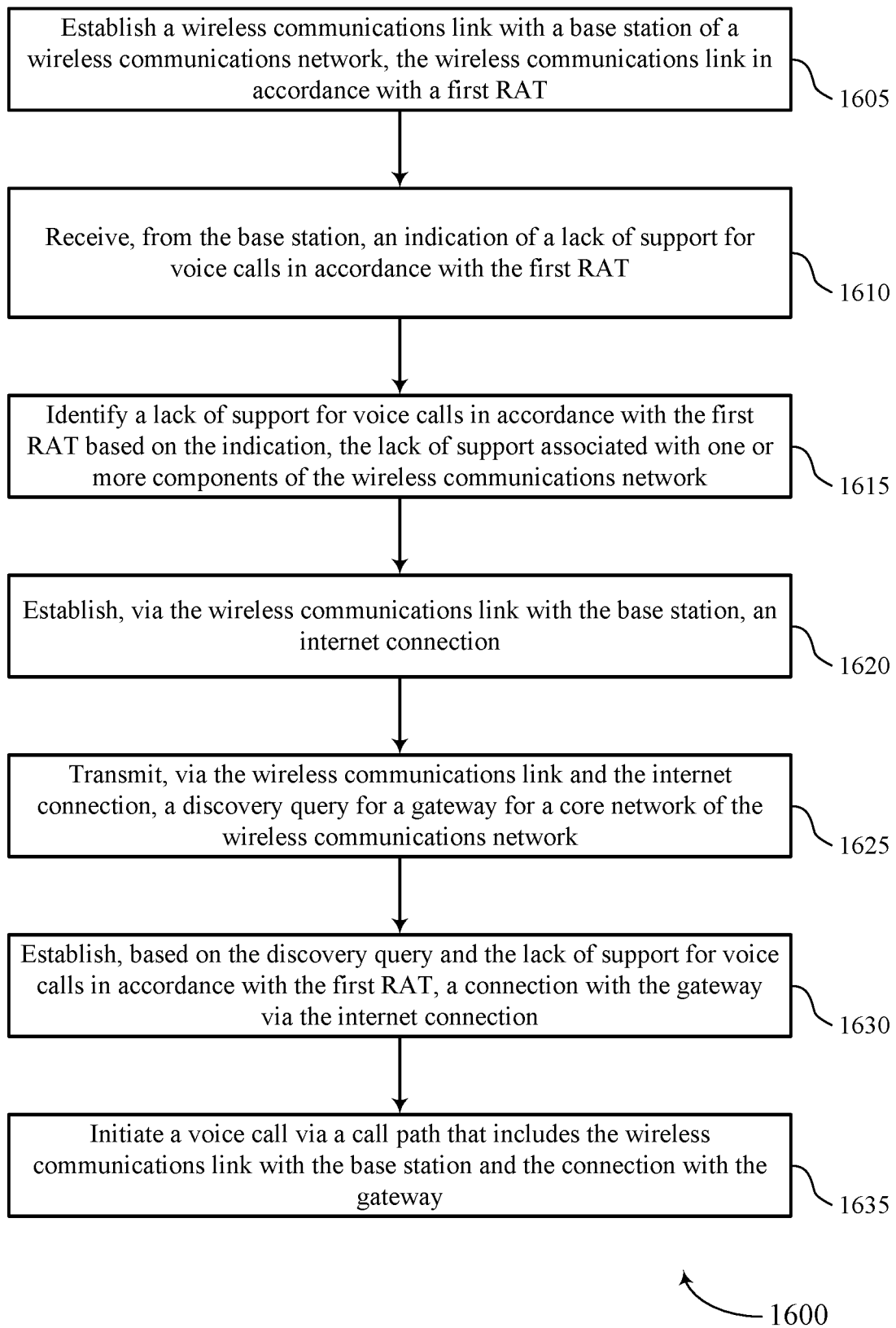

FIG. 16 shows a flowchart illustrating a method 1600 that supports gateway-based voice calls via a base station in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally, or alternatively, a UE may perform aspects of the functions described below using special-purpose hardware.

At 1605, the UE may establish a wireless communications link with a base station of a wireless communications network, the wireless communications link in accordance with a first RAT. The operations of 1605 may be performed according to the methods described herein. In some examples, aspects of the operations of 1605 may be performed by a communication link manager as described with reference to FIGS. 7 through 10. Additionally or alternatively, means for performing 1605 may, but not necessarily, include, for example, antenna 1025, transceiver 1020, communications manager 1010, memory 1030 (including code 1035), processor 1040 and/or bus 1045.

At 1610, the UE may receive, from the base station, an indication of a lack of support for voice calls in accordance with the first RAT. The operations of 1610 may be performed according to the methods described herein. In some examples, aspects of the operations of 1610 may be performed by a voice call manager as described with reference to FIGS. 7 through 10. Additionally or alternatively, means for performing 1610 may, but not necessarily, include, for example, antenna 1025, transceiver 1020, communications manager 1010, memory 1030 (including code 1035), processor 1040 and/or bus 1045.

At 1615, the UE may identify the lack of support for voice calls in accordance with the first RAT based on the indication, the lack of support associated with one or more components of the wireless communications network. The operations of 1615 may be performed according to the methods described herein. In some examples, aspects of the operations of 1615 may be performed by a voice call manager as described with reference to FIGS. 7 through 10. Additionally or alternatively, means for performing 1615 may, but not necessarily, include, for example, antenna 1025, transceiver 1020, communications manager 1010, memory 1030 (including code 1035), processor 1040 and/or bus 1045.

At 1620, the UE may establish, via the wireless communications link with the base station, an internet connection. The operations of 1620 may be performed according to the methods described herein. In some examples, aspects of the operations of 1620 may be performed by an internet connection manager as described with reference to FIGS. 7 through 10. Additionally or alternatively, means for performing 1620 may, but not necessarily, include, for example, antenna 1025, transceiver 1020, communications manager 1010, memory 1030 (including code 1035), processor 1040 and/or bus 1045.

At 1625, the UE may transmit, via the wireless communications link and the internet connection, a discovery query for a gateway for a core network of the wireless communications network. The operations of 1625 may be performed according to the methods described herein. In some examples, aspects of the operations of 1625 may be performed by a gateway manager as described with reference to FIGS. 7 through 10. Additionally or alternatively, means for performing 1625 may, but not necessarily, include, for example, antenna 1025, transceiver 1020, communications manager 1010, memory 1030 (including code 1035), processor 1040 and/or bus 1045.

At 1630, the UE may establish, based on the discovery query and the lack of support for voice calls in accordance with the first RAT, a connection with the gateway via the internet connection. The operations of 1630 may be performed according to the methods described herein. In some examples, aspects of the operations of 1630 may be performed by a gateway manager as described with reference to FIGS. 7 through 10. Additionally or alternatively, means for performing 1630 may, but not necessarily, include, for example, antenna 1025, transceiver 1020, communications manager 1010, memory 1030 (including code 1035), processor 1040 and/or bus 1045.

At 1635, the UE may initiate a voice call via a call path that includes the wireless communications link with the base station and the connection with the gateway. The operations of 1635 may be performed according to the methods described herein. In some examples, aspects of the operations of 1635 may be performed by a voice call manager as described with reference to FIGS. 7 through 10. Additionally or alternatively, means for performing 1635 may, but not necessarily, include, for example, antenna 1025, transceiver 1020, communications manager 1010, memory 1030 (including code 1035), processor 1040 and/or bus 1045.

Figure 17:
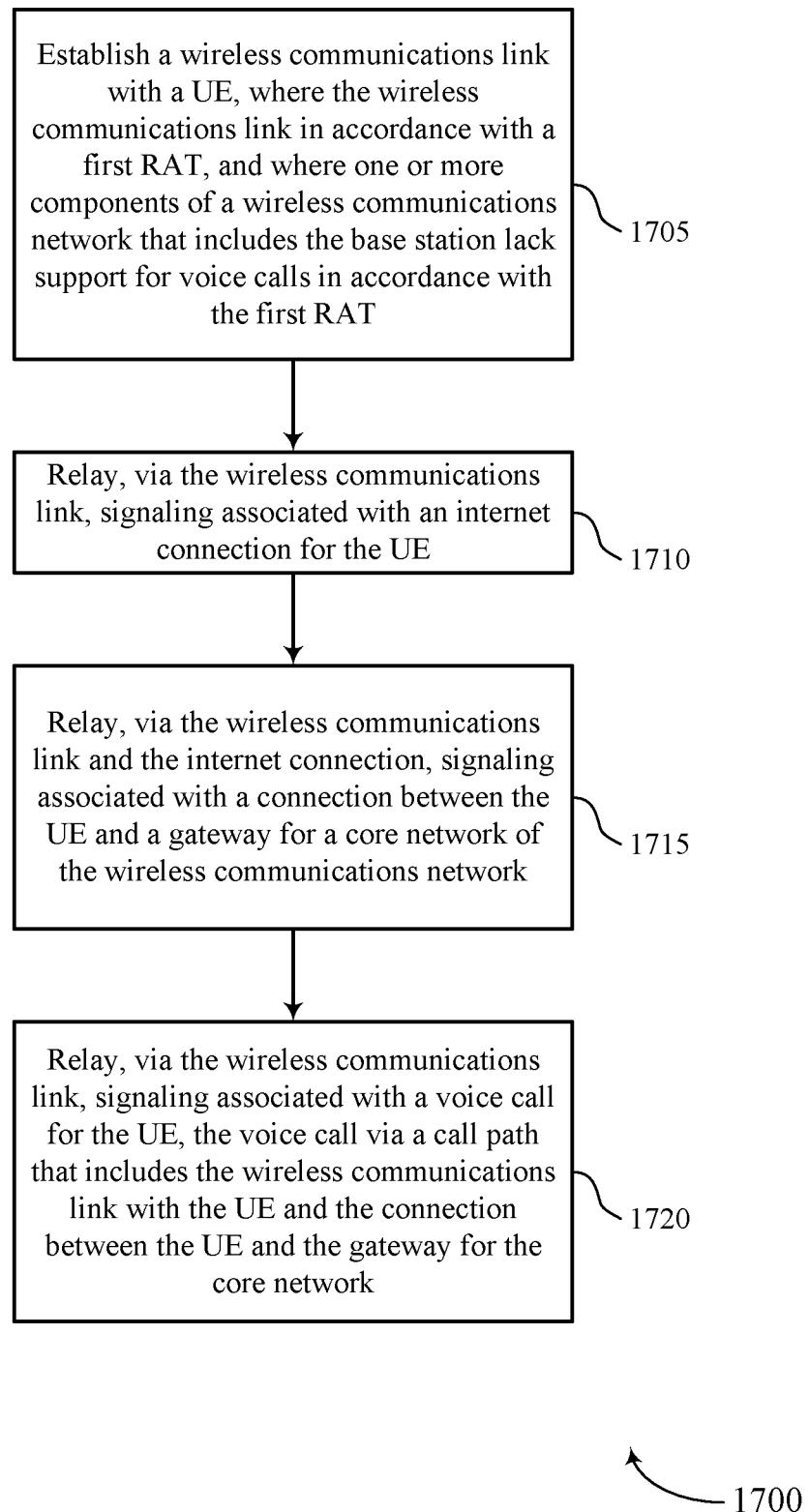

FIG. 17 shows a flowchart illustrating a method 1700 that supports gateway-based voice calls via a base station in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 1705, the base station may establish a wireless communications link with a UE, where the wireless communications link is in accordance with a first RAT, and where one or more components of a wireless communications network that includes the base station lack support for voice calls in accordance with the first RAT. The operations of 1705 may be performed according to the methods described herein. In some examples, aspects of the operations of 1705 may be performed by a communication link manager as described with reference to FIGS. 11 through 14. Additionally or alternatively, means for performing 1705 may, but not necessarily, include, for example, antenna 1425, transceiver 1420, communications manager 1410, memory 1430 (including code 1435), processor 1440 and/or bus 1450.

At 1710, the base station may relay, via the wireless communications link, signaling associated with an internet connection for the UE. The operations of 1710 may be performed according to the methods described herein. In some examples, aspects of the operations of 1710 may be performed by an internet connection manager as described with reference to FIGS. 11 through 14. Additionally or alternatively, means for performing 1710 may, but not necessarily, include, for example, antenna 1425, transceiver 1420, communications manager 1410, memory 1430 (including code 1435), processor 1440 and/or bus 1450.

At 1715, the base station may relay, via the wireless communications link and the internet connection, signaling associated with a connection between the UE and a gateway for a core network of the wireless communications network. The operations of 1715 may be performed according to the methods described herein. In some examples, aspects of the operations of 1715 may be performed by a gateway manager as described with reference to FIGS. 11 through 14. Additionally or alternatively, means for performing 1715 may, but not necessarily, include, for example, antenna 1425, transceiver 1420, communications manager 1410, memory 1430 (including code 1435), processor 1440 and/or bus 1450.

At 1720, the base station may relay, via the wireless communications link, signaling associated with a voice call for the UE, the voice call via a call path that includes the wireless communications link with the UE and the connection between the UE and the gateway for the core network. The operations of 1720 may be performed according to the methods described herein. In some examples, aspects of the operations of 1720 may be performed by a voice call manager as described with reference to FIGS. 11 through 14. Additionally or alternatively, means for performing 1720 may, but not necessarily, include, for example, antenna 1425, transceiver 1420, communications manager 1410, memory 1430 (including code 1435), processor 1440 and/or bus 1450.

Figure 18:
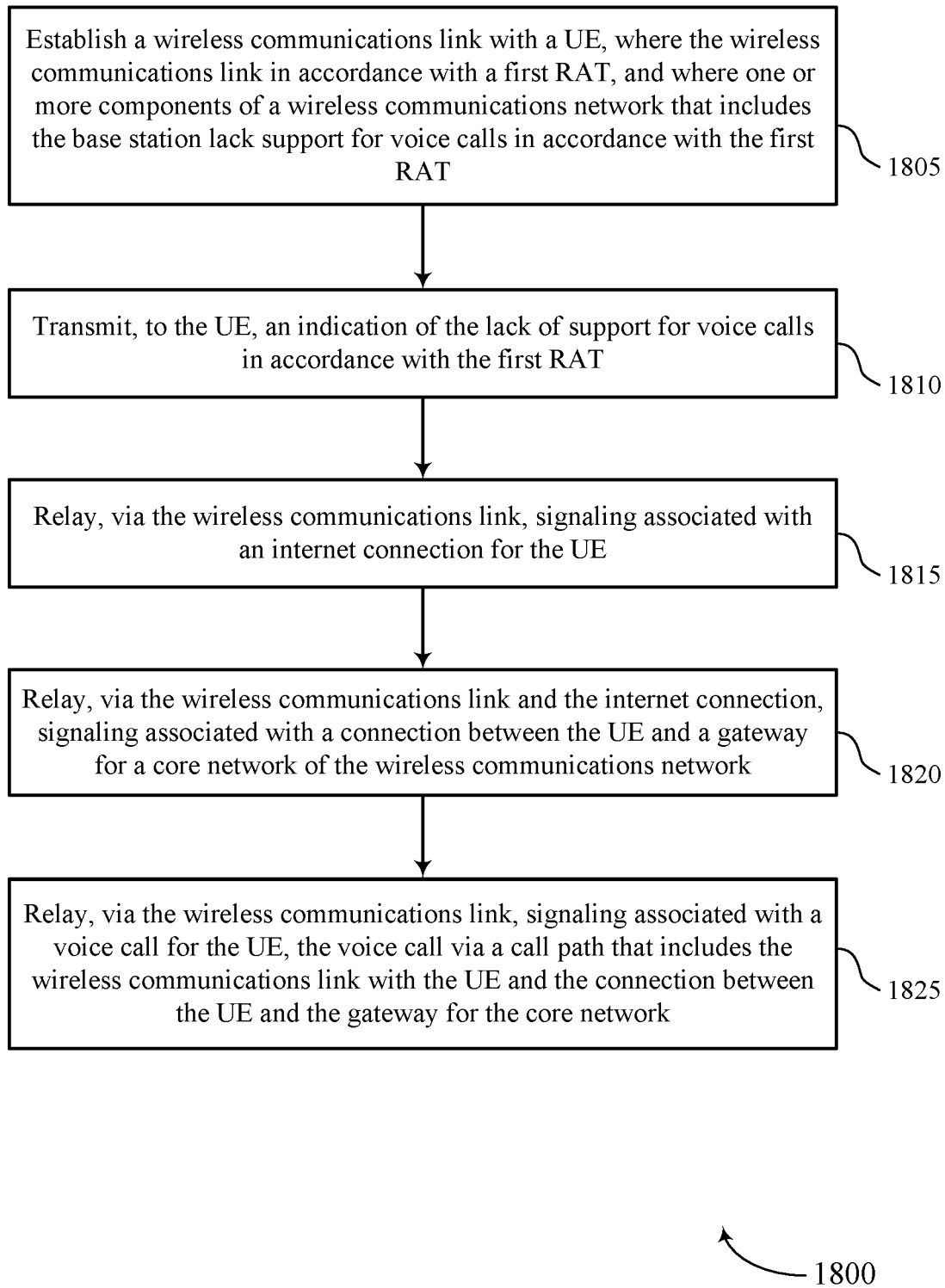

FIG. 18 shows a flowchart illustrating a method 1800 that supports gateway-based voice calls via a base station in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally, or alternatively, a base station may perform aspects of the functions described below using special-purpose hardware.

At 1805, the base station may establish a wireless communications link with a UE, where the wireless communications link is in accordance with a first RAT, and where one or more components of a wireless communications network that includes the base station lack support for voice calls in accordance with the first RAT. The operations of 1805 may be performed according to the methods described herein. In some examples, aspects of the operations of 1805 may be performed by a communication link manager as described with reference to FIGS. 11 through 14. Additionally or alternatively, means for performing 1805 may, but not necessarily, include, for example, antenna 1425, transceiver 1420, communications manager 1410, memory 1430 (including code 1435), processor 1440 and/or bus 1450.

At 1810, the base station may transmit, to the UE, an indication of the lack of support for voice calls in accordance with the first RAT. The operations of 1810 may be performed according to the methods described herein. In some examples, aspects of the operations of 1810 may be performed by a voice call manager as described with reference to FIGS. 11 through 14. Additionally or alternatively, means for performing 1810 may, but not necessarily, include, for example, antenna 1425, transceiver 1420, communications manager 1410, memory 1430 (including code 1435), processor 1440 and/or bus 1450.

At 1815, the base station may relay, via the wireless communications link, signaling associated with an internet connection for the UE. The operations of 1815 may be performed according to the methods described herein. In some examples, aspects of the operations of 1815 may be performed by an internet connection manager as described with reference to FIGS. 11 through 14. Additionally or alternatively, means for performing 1815 may, but not necessarily, include, for example, antenna 1425, transceiver 1420, communications manager 1410, memory 1430 (including code 1435), processor 1440 and/or bus 1450.

At 1820, the base station may relay, via the wireless communications link and the internet connection, signaling associated with a connection between the UE and a gateway for a core network of the wireless communications network. The operations of 1820 may be performed according to the methods described herein. In some examples, aspects of the operations of 1820 may be performed by a gateway manager as described with reference to FIGS. 11 through 14. Additionally or alternatively, means for performing 1820 may, but not necessarily, include, for example, antenna 1425, transceiver 1420, communications manager 1410, memory 1430 (including code 1435), processor 1440 and/or bus 1450.

At 1825, the base station may relay, via the wireless communications link, signaling associated with a voice call for the UE, the voice call via a call path that includes the wireless communications link with the UE and the connection between the UE and the gateway for the core network. The operations of 1825 may be performed according to the methods described herein. In some examples, aspects of the operations of 1825 may be performed by a voice call manager as described with reference to FIGS. 11 through 14. Additionally or alternatively, means for performing 1825 may, but not necessarily, include, for example, antenna 1425, transceiver 1420, communications manager 1410, memory 1430 (including code 1435), processor 1440 and/or bus 1450.

It should be noted that the methods described herein describe possible implementations, and that the operations and the steps may be rearranged or otherwise modified and that other implementations are possible. Further, aspects from two or more of the methods may be combined.

Aspect 1: A method for wireless communications at a UE, comprising: establishing a wireless communications link with a base station of a wireless communications network, the wireless communications link in accordance with a first RAT; identifying a lack of support for voice calls in accordance with the first RAT, the lack of support associated with one or more components of the wireless communications network; establishing, via the wireless communications link with the base station, an internet connection; transmitting, via the wireless communications link and the internet connection, a discovery query for a gateway for a core network of the wireless communications network; establishing, based at least in part on the discovery query and the lack of support for voice calls in accordance with the first RAT, a connection with the gateway via the internet connection; and initiating a voice call via a call path that comprises the wireless communications link with the base station and the connection with the gateway.

Aspect 2: The method of aspect 1, further comprising: attempting to initiate a prior voice call via the base station in accordance with the first RAT; and completing the prior voice call via the base station in accordance with a second RAT, wherein identifying the lack of support for voice calls in accordance with the first RAT is based at least in part on completing the prior voice call in accordance with the second RAT.

Aspect 3: The method of any of aspects 1 through 2, wherein the UE is preconfigured to disable voice calls in accordance with the first RAT, identifying the lack of support for voice calls in accordance with the first RAT is based at least in part on the UE being preconfigured.

Aspect 4: The method of any of aspects 1 through 3, further comprising: receiving, from the base station, an indication of the lack of support for voice calls in accordance with the first RAT, wherein identifying the lack of support for voice calls in accordance with the first RAT is based at least in part on the indication.

Aspect 5: The method of aspect 4, wherein receiving the indication comprises receiving system information, radio resource control information, or any combination thereof.

Aspect 6: The method of any of aspects 1 through 5, wherein the gateway for the core network comprises an evolved packet data gateway corresponding to a second RAT.

Aspect 7: The method of any of aspects 1 through 6, wherein the gateway for the core network comprises an interworking function corresponding to the first RAT.

Aspect 8: The method of any of aspects 1 through 7, wherein initiating the voice call is via a user plane function associated with the base station.

Aspect 9: The method of aspect 8, wherein initiating the voice call is further via a second gateway, and wherein the gateway comprises an ePDG and the second gateway comprises a PGW.

Aspect 10: The method of aspect 8, wherein initiating the voice call is further via a user plane function associated with the gateway, and wherein the gateway comprises an interworking function corresponding to the first RAT.

Aspect 11: The method of any of aspects 1 through 10, wherein the lack of support for voice calls in accordance with the first RAT comprises a lack of support for a quality of service (QoS) bearer corresponding to voice calls in accordance with the first RAT.

Aspect 12: The method of any of aspects 1 through 11, wherein the core network comprises an IMS.

Aspect 13: The method of aspect 12, further comprising: registering with the IMS via the wireless communications link with the base station and the connection with the gateway, wherein initiating the voice call is based at least in part on registering with the IMS.

Aspect 14: The method of any of aspects 1 through 13, further comprising: conducting the voice call based at least in part on transmitting signaling via the call path.

Aspect 15: A method for wireless communications at a base station, comprising: establishing a wireless communications link with a UE, wherein the wireless communications link is in accordance with a first RAT, and wherein one or more components of a wireless communications network that includes the base station lack support for voice calls in accordance with the first RAT; relaying, via the wireless communications link, signaling associated with an internet connection for the UE; relaying, via the wireless communications link and the internet connection, signaling associated with a connection between the UE and a gateway for a core network of the wireless communications network; and relaying, via the wireless communications link, signaling associated with a voice call for the UE, the voice call via a call path that comprises the wireless communications link with the UE and the connection between the UE and the gateway for the core network.

Aspect 16: The method of aspect 15, further comprising: transmitting, to the UE, an indication of the lack of support for voice calls in accordance with the first RAT.

Aspect 17: The method of aspect 16, wherein transmitting the indication comprises transmitting system information, radio resource control information, or any combination thereof.

Aspect 18: The method of any of aspects 15 through 17, wherein the signaling associated with the connection between the UE and the gateway comprises a discovery query for the gateway.

Aspect 19: The method of any of aspects 15 through 18, wherein the gateway for the core network comprises an evolved packet data gateway corresponding to a second RAT.

Aspect 20: The method of any of aspects 15 through 19, wherein the gateway for the core network comprises an interworking function corresponding to the first RAT.

Aspect 21: The method of any of aspects 15 through 20, wherein relaying the signaling associated with the voice call is via a user plane function associated with the base station.

Aspect 22: The method of aspect 21, wherein relaying the signaling associated with the voice call is further via a second gateway, and wherein the gateway comprises an ePDG and the second gateway comprises a PGW.

Aspect 23: The method of aspect 21, wherein relaying the signaling associated with the voice call is further via a user plane function associated with the gateway, and wherein the gateway comprises an interworking function corresponding to the first RAT.

Aspect 24: The method of any of aspects 15 through 23, wherein the lack of support for voice calls in accordance with the first RAT comprises a lack of support for a quality of service (QoS) bearer corresponding to voice calls in accordance with the first RAT.

Aspect 25: The method of any of aspects 15 through 24, wherein the core network comprises an IMS.

Aspect 26: The method of aspect 25, further comprising: relaying, via the wireless communications link and before relaying the signaling associated with the voice call, signaling associated with a registration of the UE with the IMS.

Aspect 27: An apparatus for wireless communications at a UE, comprising a processor; memory coupled with the processor; and instructions stored in the memory and executable by the processor to cause the apparatus to perform a method of any of aspects 1 through 14.

Aspect 28: An apparatus for wireless communications at a UE, comprising at least one means for performing a method of any of aspects 1 through 14.

Aspect 29: A non-transitory computer-readable medium storing code for wireless communications at a UE, the code comprising instructions executable by a processor to perform a method of any of aspects 1 through 14.

Aspect 30: An apparatus for wireless communications at a base station, comprising a processor; memory coupled with the processor; and instructions stored in the memory and executable by the processor to cause the apparatus to perform a method of any of aspects 15 through 26.

Aspect 31: An apparatus for wireless communications at a base station, comprising at least one means for performing a method of any of aspects 15 through 26.

Aspect 32: A non-transitory computer-readable medium storing code for wireless communications at a base station, the code comprising instructions executable by a processor to perform a method of any of aspects 15 through 26.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    establishing a wireless communications link with a base station of a wireless communications network, the wireless communications link in accordance with a first radio access technology (RAT);
    identifying a lack of support for voice calls of a first type in accordance with the first RAT, the lack of support associated with one or more components of the wireless communications network;
    establishing, via the wireless communications link with the base station, an internet connection;
    transmitting, via the wireless communications link and the internet connection, a discovery query for a gateway for a core network of the wireless communications network;
    establishing, based at least in part on the discovery query and the lack of support for voice calls of the first type in accordance with the first RAT, a connection with the gateway via the internet connection; and
    initiating a voice call of a second type via a call path that comprises the wireless communications link with the base station and the connection with the gateway, wherein the voice calls of the first type are different than voice calls of the second type.

2. The method of claim 1, further comprising:
    attempting to initiate a prior voice call of the first type via the base station in accordance with the first RAT; and
    completing the prior voice call of the first type via the base station in accordance with a second RAT, wherein identifying the lack of support for voice calls of the first type in accordance with the first RAT is based at least in part on completing the prior voice call of the second type in accordance with the second RAT.

3. The method of claim 1, wherein the UE is preconfigured to disable voice calls of the first type in accordance with the first RAT, wherein identifying the lack of support for voice calls of the first type in accordance with the first RAT is based at least in part on the UE being preconfigured.

4. The method of claim 1, further comprising:
    receiving, from the base station, an indication of the lack of support for voice calls of the first type in accordance with the first RAT, wherein identifying the lack of support for voice calls of the first type in accordance with the first RAT is based at least in part on the indication.

5. The method of claim 4, wherein receiving the indication comprises receiving system information, radio resource control information, or any combination thereof.

6. The method of claim 1, wherein the gateway for the core network comprises an evolved packet data gateway (ePDG) corresponding to a second RAT.

7. The method of claim 1, wherein the gateway for the core network comprises an interworking function corresponding to the first RAT.

8. The method of claim 1, wherein initiating the voice call of the second type is via a user plane function associated with the base station.

9. The method of claim 8, wherein initiating the voice call of the second type is further via a second gateway, and wherein the gateway comprises an evolved packet data gateway (ePDG) and the second gateway comprises a packet gateway (PGW).

10. The method of claim 8, wherein initiating the voice call of the second type is further via a user plane function associated with the gateway, and wherein the gateway comprises an interworking function corresponding to the first RAT.

11. The method of claim 1, wherein the lack of support for voice calls of the first type in accordance with the first RAT comprises a lack of support for a quality of service (QOS) bearer corresponding to voice calls of the first type in accordance with the first RAT.

12. The method of claim 1, wherein the core network comprises an internet protocol (IP) multimedia subsystem (IMS).

13. The method of claim 12, further comprising:
    registering with the IMS via the wireless communications link with the base station and the connection with the gateway, wherein initiating the voice call of the second type is based at least in part on registering with the IMS.

14. The method of claim 1, further comprising:
    conducting the voice call of the second type based at least in part on transmitting signaling via the call path.

15. An apparatus for wireless communications, comprising:
    at least one processor of a user equipment (UE); and
    memory coupled with the at least one processor, the memory and the at least one processor configured to cause the apparatus to:
        establish a wireless communications link with a base station of a wireless communications network, the wireless communications link in accordance with a first radio access technology (RAT);
        identify a lack of support for voice calls of a first type in accordance with the first RAT, the lack of support associated with one or more components of the wireless communications network;
        establish, via the wireless communications link with the base station, an internet connection;
        transmit, via the wireless communications link and the internet connection, a discovery query for a gateway for a core network of the wireless communications network;
        establish, based at least in part on the discovery query and the lack of support for voice calls of the first type in accordance with the first RAT, a connection with the gateway for the core network via the internet connection; and
        initiate a voice call of a second type via a call path that comprises the wireless communications link with the base station and the connection with the gateway for the core network, wherein the voice calls of the first type are different than voice calls of the second type.

16. The apparatus of claim 15, the memory and the at least one processor further configured to cause the apparatus to:
attempt to initiate a prior voice call of the first type via the base station in accordance with the first RAT; and
complete the prior voice call of the first type via the base station in accordance with a second RAT, wherein identifying the lack of support for voice calls of the first type in accordance with the first RAT is based at least in part on completing the prior voice call of the second type in accordance with the second RAT.

17. The apparatus of claim 15, the memory and the at least one processor further configured to cause the apparatus to:
receive, from the base station, an indication of the lack of support for voice calls of the first type in accordance with the first RAT, wherein identifying the lack of support for voice calls of the first type in accordance with the first RAT is based at least in part on the indication.

18. The apparatus of claim 17, wherein, to receive the indication, the memory and the at least one processor are configured to cause the apparatus to receive system information, radio resource control information, or any combination thereof.

19. The apparatus of claim 15, wherein the apparatus is preconfigured to disable voice calls of the first type in accordance with the first RAT, wherein the memory and the at least one processor are configured to cause the apparatus to identify the lack of support for voice calls of the first type in accordance with the first RAT based at least in part on the UE being preconfigured.

20. The apparatus of claim 15, wherein the gateway for the core network comprises an evolved packet data gateway (ePDG) corresponding to a second RAT.

21. The apparatus of claim 15, wherein the gateway for the core network comprises an interworking function corresponding to the first RAT.

22. The apparatus of claim 15, wherein the memory and the at least one processor are configured to cause the apparatus to initiate the voice call of the second type via a user plane function associated with the base station.

23. The apparatus of claim 22, wherein the memory and the at least one processor are configured to cause the apparatus to initiate the voice call of the second type further via a second gateway, and wherein the gateway comprises an evolved packet data gateway (ePDG) and the second gateway comprises a packet gateway (PGW).

24. The apparatus of claim 22, wherein the memory and the at least one processor are configured to cause the apparatus to initiate the voice call of the second type further via a user plane function associated with the gateway, and wherein the gateway comprises an interworking function corresponding to the first RAT.

25. The apparatus of claim 15, wherein the lack of support for voice calls of the first type in accordance with the first RAT comprises a lack of support for a quality of service (QOS) bearer corresponding to voice calls of the first type in accordance with the first RAT.

26. The apparatus of claim 15, wherein the core network comprises an internet protocol (IP) multimedia subsystem (IMS).

27. The apparatus of claim 26, the memory and the at least one processor further configured to cause the apparatus to:
register with the IMS via the wireless communications link with the base station and the connection with the gateway, wherein the memory and the at least one processor are configured to cause the apparatus to initiate the voice call of the second type based at least in part on registering with the IMS.

28. The apparatus of claim 15, the memory and the at least one processor further configured to cause the apparatus to:
conduct the voice call of the second type based at least in part on transmitting signaling via the call path.

29. A user equipment (UE) for wireless communications, comprising:
means for establishing a wireless communications link with a base station of a wireless communications network, the wireless communications link in accordance with a first radio access technology (RAT);
means for identifying a lack of support for voice calls of a first type in accordance with the first RAT, the lack of support associated with one or more components of the wireless communications network;
means for establishing, via the wireless communications link with the base station, an internet connection;
means for transmitting, via the wireless communications link and the internet connection, a discovery query for a gateway for a core network of the wireless communications network;
means for establishing, based at least in part on the discovery query and the lack of support for voice calls of the first type in accordance with the first RAT, a connection with the gateway via the internet connection; and
means for initiating a voice call of a second type via a call path that comprises the wireless communications link with the base station and the connection with the gateway, wherein the voice calls of the first type are different than voice calls of the second type.

30. A non-transitory computer-readable medium storing code for wireless communications, the code comprising instructions executable by one or more processors to:
establish a wireless communications link with a base station of a wireless communications network, the wireless communications link in accordance with a first radio access technology (RAT);
identify a lack of support for voice calls of a first type in accordance with the first RAT, the lack of support associated with one or more components of the wireless communications network;
establish, via the wireless communications link with the base station, an internet connection;
transmit, via the wireless communications link and the internet connection, a discovery query for a gateway for a core network of the wireless communications network;
establish, based at least in part on the discovery query and the lack of support for voice calls of the first type in accordance with the first RAT, a connection with the gateway for the core network via the internet connection; and
initiate a voice call of a second type via a call path that comprises the wireless communications link with the base station and the connection with the gateway for the core network, wherein the voice calls of the first type are different than voice calls of the second type.

* * * * *